(12) United States Patent
Xiao et al.

(10) Patent No.: US 10,772,089 B2
(45) Date of Patent: Sep. 8, 2020

(54) METHOD AND BASE STATION FOR CONFIGURING NON-ANCHOR PHYSICAL RESOURCE BLOCK, AND METHOD AND USER EQUIPMENT FOR DETERMINING LOCATION OF NON-ANCHOR PHYSICAL RESOURCE BLOCK

(71) Applicants: SHARP KABUSHIKI KAISHA, Sakai, Osaka (JP); FG Innovation Company Limited, Tuen Mun, New Territories (HK)

(72) Inventors: Fangying Xiao, Shanghai (CN); Renmao Liu, Shanghai (CN)

(73) Assignees: SHARP KABUSHIKI KAISHA, Sakai, Osaka (JP); FG Innovation Company Limited, Tuen Mun (HK)

( * ) Notice: Subject to any disclaimer, the term of this patent is extended or adjusted under 35 U.S.C. 154(b) by 68 days.

(21) Appl. No.: 16/090,209

(22) PCT Filed: Feb. 10, 2017

(86) PCT No.: PCT/CN2017/073240
§ 371 (c)(1),
(2) Date: Sep. 29, 2018

(87) PCT Pub. No.: WO2017/166931
PCT Pub. Date: Oct. 5, 2017

(65) Prior Publication Data
US 2019/0124628 A1  Apr. 25, 2019

(30) Foreign Application Priority Data
Apr. 1, 2016 (CN) .......................... 2016 1 0203788

(51) Int. Cl.
*H04W 4/00* (2018.01)
*H04W 72/04* (2009.01)
(Continued)

(52) U.S. Cl.
CPC ......... *H04W 72/042* (2013.01); *H04L 5/0091* (2013.01); *H04W 4/50* (2018.02);
(Continued)

(58) Field of Classification Search
CPC ... H04W 72/042; H04W 72/044; H04W 4/50; H04W 84/042; H04W 4/70;
(Continued)

(56) References Cited

U.S. PATENT DOCUMENTS

| 2013/0294268 | A1* | 11/2013 | Xu ....................... H04W 72/082 370/252 |
| 2016/0072614 | A1 | 3/2016 | Blankenship et al. |
| 2017/0238292 | A1* | 8/2017 | Rico Alvarino .... H04W 72/044 370/329 |
| 2017/0289965 | A1* | 10/2017 | You ....................... H04W 48/12 |

(Continued)

OTHER PUBLICATIONS

QUALCOMM Incorporated, "New Work Item: NarrowBand IOT (NB-IOT)", 3GPP TSG RAN Meeting #69, RP-151621, Phoenix, USA, Sep. 14-16, 2015.

(Continued)

*Primary Examiner* — Chuong T Ho
(74) *Attorney, Agent, or Firm* — ScienBiziP, P.C.

(57) ABSTRACT

The present invention provides a method for configuring a non-anchor PRB executed at a base station, comprising: configuring a non-anchor PRB for a user equipment (UE) for unicast data transmission, wherein the non-anchor PRB is selected from a set of Long Term Evolution (LTE) in-band PRBs or a set of PRBs in the LTE in-band PRBs capable of being used as anchor PRBs; and sending to the UE configuration information of the non-anchor PRB. The present invention further provides a base station for executing the method, a method for determining a location of a non-anchor physical resource block (PRB) executed at a UE, and a UE for executing the method.

6 Claims, 17 Drawing Sheets

(51) Int. Cl.
  *H04L 5/00* (2006.01)
  *H04W 4/50* (2018.01)
  *H04W 4/70* (2018.01)
  *H04W 84/04* (2009.01)

(52) U.S. Cl.
  CPC ......... *H04W 72/044* (2013.01); *H04L 5/0007* (2013.01); *H04L 5/0042* (2013.01); *H04L 5/0044* (2013.01); *H04W 4/70* (2018.02); *H04W 84/042* (2013.01)

(58) Field of Classification Search
  CPC ... H04L 5/0091; H04L 5/0044; H04L 5/0042; H04L 5/0007; H04L 5/0048
  USPC .................................................. 370/329, 330
  See application file for complete search history.

(56) References Cited

U.S. PATENT DOCUMENTS

2019/0053061 A1* 2/2019 Sui ........................ H04L 5/0048
2019/0319764 A1* 10/2019 Nader ............... H04W 72/0453
2020/0010268 A1* 1/2020 Rico Alvarino ..... B65D 19/385

OTHER PUBLICATIONS

Ericsson, NSN, "New Work Item on Even Lower Complexity and Enhanced Coverage LTE UE for MTC", 3GPP TSG RAN Meeting #64, RP-140990, Sophia Antipolis, France, Jun. 10-13, 2014.
Nokia Networks, Alcatel-Lucent, Alcatel-Lucent Shanghai Bell, "NB-IoT Operation in Multiple PRBs", 3GPP TSG RAN WG1 Meeting #84, R1-160447, St Julian's, Malta, Feb. 15-19, 2016.

\* cited by examiner

500

S501 — Configure a non-anchor PRB for a user equipment (UE) for unicast data transmission, wherein the non-anchor PRB is selected from a set of LTE in-band PRBs or a set of PRBs in the LTE in-band PRBs capable of being used as anchor PRBs S503 — Send to the UE configuration information of the non-anchor PRB

S601 — Receive, from a base station, configuration information of a non-anchor PRB configured for the UE for unicast data transmission S603 — Determine, based on the configuration information, a location of the non-anchor PRB in a set of LTE in-band PRBs or a set of PRBs in the LTE in-band PRBs capable of being used as anchor PRBs S605 — Perform unicast data transmission on the non-anchor PRB

S1001 — Configure a non-anchor PRB for a UE for unicast data transmission, wherein the non-anchor PRB is selected from a set of LTE guard band PRBs S1003 — Send to the UE configuration information of the non-anchor PRB

S1101 — Receive, from a base station, configuration information of a non-anchor PRB configured for the UE for unicast data transmission S1103 — Determine, based on the configuration information, a location of the non-anchor PRB in a set of LTE guard band PRBs S1105 — Perform unicast data transmission on the non-anchor PRB

S1501 — Configure a non-anchor PRB for a UE for unicast data transmission, wherein the non-anchor PRB is selected from a set of PRBs in a frequency band of a stand-alone mode of operation S1503 — Send to the UE configuration information of the non-anchor PRB

FIG. 15

METHOD AND BASE STATION FOR CONFIGURING NON-ANCHOR PHYSICAL RESOURCE BLOCK, AND METHOD AND USER EQUIPMENT FOR DETERMINING LOCATION OF NON-ANCHOR PHYSICAL RESOURCE BLOCK

TECHNICAL FIELD

The present invention relates to the field of wireless communication technology. More specifically, the present invention relates to a method for configuring a non-anchor physical resource block and a corresponding base station, and a method for determining a location of a non-anchor physical resource block and a corresponding user equipment.

BACKGROUND

With the rapid growth of mobile communication and great progress of technology, the world will move towards a fully interconnected network society where anyone or any device can acquire information and share data anytime and anywhere. It is estimated that there will be 50 billion interconnected equipments by 2020, of which only about 10 billion may be mobile phones and tablet computers. The rest are not machines communicating with human beings but machines communicating with one another. Therefore, how to design a system to better support the Internet of Everything is a subject needing further and intensive study.

In the standard of Long Term Evolution (LTE) of the Third Generation Partnership Project (3GPP), machine-to-machine communication is called machine type communication (MTC). MTC is a data communication service that does not require human participation. Deployment of large-scale MTC user equipments (UE) can be used in fields such as security, tracking, billing, measurement and consumer electronics; and the specific applications of large-scale MTC user equipments include video monitoring, supply chain tracking, intelligent meter reading, remote monitoring, etc. MTC requires lower power consumption and supports lower data transmission rate and lower mobility. The current LTE system is mainly for man-to-man communication services. The key to achieving the competitive scale advantages and application prospects of MTC services is that the LTE network supports low-cost MTC equipments.

In addition, some MTC equipments need to be installed in the basement of a residential building or at a position within the protection of an insulating foil, a metal window or a thick wall of a traditional building; as compared with the conventional equipment terminals (such as mobile phones and tablet computers) in LTE networks, the air interfaces of these MTC equipment swill obviously suffer from more serious penetration losses. 3GPP decides to study the project design and performance evaluation of MTC equipments with enhanced additional 20 dB coverage. It should be noted that MTC equipments located at poor network coverage areas have the following characteristics: extremely low data transmission rates, low latency requirements, and limited mobility. In view of the above characteristics of MTC, the LTE network can further optimize some signaling and/or channels to better support MTC services.

Therefore, at the 3GPP RAN #64 plenary session held in June 2014, a new MTC work item with low complexity and enhanced coverage for Rel-13 was proposed (see non-patent literature: RP-140990 New work Item on Even Lower Complexity and Enhanced Coverage LTE UE for MTC, Ericsson, NSN). In the description of this work item, an LTE Rel-13 system needs to support uplink/downlink 1.4 MHz RF bandwidth for an MTC user equipment to operate at any system bandwidth (for example, 1.4 MHz, 3 MHz, 5 MHz, 10 MHz, 15 MHz, or 20 MHz). The standardization of the work item would be completed at the end of 2015.

In addition, for better implementation of the Internet of Everything, at the 3GPP RAN #69 plenary session held in September 2015, a new work item was further proposed (see non-patent literature: RP-151621 New Work Item: Narrow-Band IOT (NB-IOT), which may be called narrowband Internet of Things (NB-IOT). In the description of this item, NB-IOT needs to support uplink/downlink 180 KHz RF bandwidth and three modes of operation (deployment mode): stand-alone mode of operation, guard-band mode of operation, and in-band mode of operation. The stand-alone mode of operation is to implement NB-IOT on the existing GSM frequency band, i.e., using the operating frequency band of an existing GERAN system and a scattering frequency band potentially deployed by the IOT. The guard-band mode of operation is to implement NB-IOT in the guard band of one LTE carrier, i.e., using a frequency band in the LTE frequency band that is used as the guard band. The in-band mode of operation is to implement NB-IOT in the existing LTE frequency band, i.e., using the frequency band in the LTE frequency band for actual transmission. Different bearer modes may adopt different physical parameters and processing mechanisms.

The 3GPP RAN1 working group concluded that NB IoT physical resource blocks (PRBs) are divided into anchor PRBs and non-anchor PRBs. The anchor PRB can be used for transmitting data related to NB-IoT, such as a master system information block (MIB), a primary synchronization signal (PSS)/secondary synchronization signal (SSS), or a system information block (SIB), while the non-anchor PRB can be used only by a user equipment to receive or send data for unicast transmission related to NB-IoT, such as a physical downlink control channel (PDCCH), a physical downlink shared channel (PDSCH), or a physical uplink shared channel (PUSCH). A PRB already used for transmitting MIB, PSS/SSS, or SIB data related to NB-IoT cannot be used as a non-anchor PRB. When an eNB does not configure a non-anchor PRB for the UE, the anchor PRB may also be used by the user equipment (UE) to receive or send data related to NB-IoT for unicast transmission such as a PDCCH, a PDSCH, or a PUSCH. A base station (e.g., an eNB) may configure a non-anchor PRB for the UE through a radio resource control (RRC) connection establishment message, an RRC connection reestablishment message, an RRC reconfiguration message, an RRC resume message, or the like.

According to whether frequency bands to which frequencies of an anchor PRB accessed by the UE and a non-anchor PRB allocated by the eNB to the UE belong are an in-band frequency band of LTE, a guard band frequency band of LTE, or a frequency band of the stand-alone mode of operation (for example, the GSM frequency band), the following anchor PRB and non-anchor PRB combination modes may exist (1) in-band to in-band; that is, the anchor PRB and the non-anchor PRB are both in-band PRBs (the frequency bands of the anchor PRB and the non-anchor PRB are both an in-band frequency band); (2) in-band to guard band; that is, the anchor PRB is an in-band PRB and the non-anchor PRB is in the guard band (the anchor PRB is in the in-band frequency band and the non-anchor PRB is in the guard band frequency band); (3) guard band to guard band; that is, the anchor PRB and the non-anchor PRB are both in the guard band (the frequency bands of the anchor PRB and the non-anchor PRB are both the guard band frequency band); (4) guard band to in-band; that is, the anchor PRB is in the guard band and the non-anchor PRB is an in-band PRB (the anchor PRB is in the guard band frequency band and the non-anchor PRB is in the in-band frequency band); and (5) stand-alone to stand-alone; that is, the anchor PRB and the non-anchor PRB are both in a frequency band suitable for the stand-alone mode of operation (for example, the GSM frequency band).

Based on the different combination modes of the anchor PRB and the non-anchor PRB described above, how to configure a non-anchor PRB for the UE so that the UE can determine the frequency of the non-anchor PRB to receive or send, on the non-anchor PRB, data related to NB-IoT for unicast transmission such as a PDCCH, a PDSCH, or a PUSCH is a problem that needs to be addressed.

SUMMARY OF INVENTION

According to one aspect of the present invention, a method for configuring a non-anchor physical resource block (PRB) executed at a base station is provided, comprising:

configuring a non-anchor PRB for a user equipment (UE) for unicast data transmission, wherein the non-anchor PRB is selected from a set of Long Term Evolution (LTE) in-band PRBs or a set of PRBs capable of being used as anchor PRBs in the LTE in-band PRBs; and sending to the UE configuration information of the non-anchor PRB.

In one embodiment, the PRB already used as an anchor PRB is an LTE in-band PRB.

In one embodiment, when a physical cell identifier (PCI) of a cell where the anchor PRB locates is the same as a PCI of a corresponding LTE cell, the step of configuring a non-anchor PRB comprises:

configuring for the UE: an offset of the non-anchor PRB from an middle PRB of LTE and a first offset indication, wherein the middle PRB of LTE is a PRB in the middle of an LTE bandwidth, and the first offset indication is used for indicating whether the non-anchor PRB, when compared with the middle PRB of LTE, is in a higher frequency band or lower frequency band; or an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, when a physical cell identifier (PCI) of a cell where the anchor PRB locates is the same as a PCI of a corresponding LTE cell, the method further comprises:

sending to the UE system bandwidth indication information, and wherein the step of configuring a non-anchor PRB comprises: configuring for the UE a non-anchor PRB number.

In one embodiment, when a PCI of a cell where the anchor PRB locates is different from a PCI of a corresponding LTE cell, the method further comprises:

sending to the UE an offset of the anchor PRB from an middle PRB of LTE, wherein the middle PRB of LTE is a PRB in the middle of an LTE bandwidth, wherein the step of configuring a non-anchor PRB comprises: configuring for the UE an offset of the non-anchor PRB from the middle PRB of LTE and a first offset indication, wherein the first offset indication is used for indicating whether the non-anchor PRB, when compared with the Middle PRB of LTE, is in a higher frequency band or lower frequency band; or configuring for the UE an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, when a PCI of a cell where the anchor PRB locates is different from a PCI of a corresponding LTE cell, the method further comprises:

sending to the UE an offset of the anchor PRB from an middle PRB of LTE, wherein the middle PRB of LTE is a PRB in the middle of an LTE bandwidth; and sending to the UE system bandwidth indication information, and wherein the step of configuring a non-anchor PRB comprises: configuring for the UE a non-anchor PRB number.

In one embodiment, when a PCI of a cell where the anchor PRB locates is different from a PCI of a corresponding LTE cell, the method further comprises:

sending to the UE system bandwidth indication information and an anchor PRB number, wherein the step of configuring a non-anchor PRB comprises:

configuring for the UE a non-anchor PRB number; or configuring for the UE an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, the PRB already used as an anchor PRB is in a guard band.

In one embodiment, the method further comprises:

sending to the UE an offset of a central frequency of the anchor PRB from an LTE central frequency, wherein the step of configuring a non-anchor PRB comprises: configuring for the UE an offset of the non-anchor PRB from the middle PRB of LTE and a first offset indication, wherein the first offset indication is used for indicating whether the non-anchor PRB, when compared with the middle PRB of LTE, is in a higher frequency band or lower frequency band; or configuring for the UE a non-anchor PRB number; or configure for the UE an offset of the non-anchor PRB from the anchor PRB.

According to another aspect of the present invention, a base station is provided, comprising:

a configuration unit, configured to configure a non-anchor PRB for a user equipment (UE) for unicast data transmission, wherein the non-anchor PRB is selected from a set of Long Term Evolution (LTE) in-band PRBs or a set of PRBs capable of being used as anchor PRBs in the LTE in-band PRBs; and a transceiver, configured to send to the UE configuration information of the non-anchor PRB.

In one embodiment, the PRB already used as an anchor PRB is an LTE in-band PRB.

In one embodiment, when a physical cell identifier (PCI) of a cell where the anchor PRB locates is the same as a PCI of a corresponding LTE cell, the configuration unit is configured to:

configure for the UE: an offset of the non-anchor PRB from an middle PRB of LTE and a first offset indication, wherein the middle PRB of LTE is a PRB in the middle of an LTE bandwidth, and the first offset indication is used for indicating whether the non-anchor PRB, when compared with the middle PRB of LTE, is in a higher frequency band or lower frequency band; or an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, when a PCI of a cell where the anchor PRB locates is the same as a PCI of a corresponding LTE cell, the transceiver sends to the UE system bandwidth indication information; and the configuration unit is configured to: configure for the UE a non-anchor PRB number.

In one embodiment, when a PCI of a cell where the anchor PRB locates is different from a PCI of a corresponding LTE cell, the transceiver sends to the UE an offset of the anchor PRB from an middle PRB of LTE, wherein the middle PRB of LTE is a PRB in the middle of an LTE bandwidth; and the configuration unit is configured to: configure for the UE an offset of the non-anchor PRB from an middle PRB of LTE and a first offset indication, wherein the first offset indication is used for indicating whether the non-anchor PRB, when compared with the middle PRB of LTE, is in a higher frequency band or lower frequency band; or configure for the UE an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, when a PCI of a cell where the anchor PRB locates is different from a PCI of a corresponding LTE cell, the transceiver sends to the UE an offset of the anchor PRB from an middle PRB of LTE, wherein the middle PRB of LTE is a PRB in the middle of an LTE bandwidth; and sends to the UE system bandwidth indication information;

the configuration unit is configured to: configure for the UE a non-anchor PRB number.

In one embodiment, when a PCI of a cell where the anchor PRB locates is different from a PCI of a corresponding LTE cell, the transceiver sends to the UE system bandwidth indication information and an anchor PRB number; and the configuration unit is configured to: configure for the UE a non-anchor PRB number; or configure for the UE an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, the PRB already used as an anchor PRB is in a guard band.

In one embodiment, the transceiver sends to the UE an offset of a central frequency of the anchor PRB from an LTE central frequency; and the configuration unit is configured to:
configure for the UE an offset of the non-anchor PRB from the middle PRB of LTE and a first offset indication, wherein the first offset indication is used for indicating whether the non-anchor PRB, when compared with the middle PRB of LTE, is in a higher frequency band or lower frequency band; or
configure for the UE a non-anchor PRB number; or
configure for the UE an offset of the non-anchor PRB from the anchor PRB.

According to another aspect of the present invention, a method for determining a position of a non-anchor physical resource block (PRB) executed at a user equipment (UE) is provided, comprising:

receiving, from a base station, configuration information of a non-anchor PRB configured for the UE for unicast data transmission;

based on the configuration information, determining a location of the non-anchor PRB in a set of LTE in-band PRBs or of a set of PRBs in the LTE in-band PRBs capable of being used as anchor PRBs; and performing unicast data transmission on the non-anchor PRB.

In one embodiment, the PRB already used as an anchor PRB is an LTE in-band PRB.

In one embodiment, when a physical cell identifier (PCI) of a cell where the anchor PRB locates is the same as a PCI of a corresponding LTE cell, the received configuration information comprises:

an offset of the non-anchor PRB from an middle PRB of LTE and a first offset indication, wherein the middle PRB of LTE is a PRB in the middle of an LTE bandwidth, and the first offset indication is used for indicating whether the non-anchor PRB, when compared with the middle PRB of LTE, is in a higher frequency band or lower frequency band; or an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, when a physical cell identifier (PCI) of a cell where the anchor PRB locates is the same as a PCI of a corresponding LTE cell, the method further comprises:

receiving, from the base station, system bandwidth indication information, wherein the received configuration information comprises: a non-anchor PRB number.

In one embodiment, when a PCI of a cell where the anchor PRB locates is different from a PCI of a corresponding LTE cell, the method further comprises:

receiving, from the base station, an offset of the anchor PRB from an middle PRB of LTE, wherein the middle PRB of LTE is a PRB in the middle of an LTE bandwidth, wherein the received configuration information comprises:
an offset of the non-anchor PRB from the middle PRB of LTE and a first offset indication, wherein the first offset indication is used for indicating whether the non-anchor PRB, when compared with the middle PRB of LTE, is in a higher frequency band or lower frequency band; or
an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, when a PCI of a cell where the anchor PRB locates is different from a PCI of a corresponding LTE cell, the method further comprises:

receiving, from the base station, an offset of the anchor PRB from an middle PRB of LTE, wherein the middle PRB of LTE is a PRB in the middle of an LTE bandwidth, and receiving, from the base station, system bandwidth indication information, wherein the received configuration information comprises: a non-anchor PRB number.

In one embodiment, when a PCI of a cell where the anchor PRB locates is different from a PCI of a corresponding LTE cell, the method further comprises:

receiving, from the base station, system bandwidth indication information and an anchor PRB number,
wherein the received configuration information comprises:
a non-anchor PRB number; or
an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, the PRB already used as an anchor PRB is in a guard band.

In one embodiment, the method further comprises:
receiving, from the base station, an offset of a central frequency of the anchor PRB from an LTE central frequency,
wherein the received configuration information comprises:
an offset of the non-anchor PRB from the middle PRB of LTE and a first offset indication, wherein the first offset indication is used for indicating whether the non-anchor PRB, when compared with the middle PRB of LTE, is in a higher frequency band or lower frequency band; or
a non-anchor PRB number; or
an offset of the non-anchor PRB from the anchor PRB.

According to another aspect of the present invention, a user equipment (UE) is provided, comprising:
a transceiver, configured to receive, from a base station, configuration information of a non-anchor PRB configured for the UE for unicast data transmission; and perform unicast data transmission on the non-anchor PRB; and
a determining unit, configured to determine, based on the configuration information, a location of the non-anchor PRB in a set of LTE in-band PRBs or of a set of PRBs in the LTE in-band PRBs capable of being used as anchor PRBs.

In one embodiment, the PRB already used as an anchor PRB is an LTE in-band PRB.

In one embodiment, when a physical cell identifier (PCI) of a cell where the anchor PRB locates is the same as a PCI of a corresponding LTE cell, the received configuration information comprises:
an offset of the non-anchor PRB from an middle PRB of LTE and a first offset indication, wherein the middle PRB of LTE is a PRB in the middle of an LTE bandwidth, and the first offset indication is used for indicating whether the non-anchor PRB, when compared with the middle PRB of LTE, is in a higher frequency band or lower frequency band; or
an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, when a PCI of a cell where the anchor PRB locates is the same as a PCI of a corresponding LTE cell, the transceiver receives, from the base station, system bandwidth indication information,
wherein the received configuration information comprises: a non-anchor PRB number.

In one embodiment, when a PCI of a cell where the anchor PRB locates is different from a PCI of a corresponding LTE cell, the transceiver receives, from the base station, an offset of the anchor PRB from an middle PRB of LTE, wherein the middle PRB of LTE is a PRB in the middle of an LTE bandwidth,
wherein the received configuration information comprises:
an offset of the non-anchor PRB from the Middle PRB of LTE and a first offset indication, wherein the first offset indication is used for indicating whether the non-anchor PRB, when compared with the Middle PRB of LTE, is in a higher frequency band or lower frequency band; or
an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, when a PCI of a cell where the anchor PRB locates is different from a PCI of a corresponding LTE cell, the transceiver receives, from the base station, an offset of the anchor PRB from an Middle PRB of LTE, wherein the Middle PRB of LTE is a PRB in the middle of an LTE bandwidth; and receives, from the base station, system bandwidth indication information,
wherein the received configuration information comprises: a non-anchor PRB number.

In one embodiment, when a PCI of a cell where the anchor PRB locates is different from a PCI of a corresponding LTE cell, the transceiver receives, from the base station, system bandwidth indication information and an anchor PRB number,
wherein the received configuration information comprises:
a non-anchor PRB number; or
an offset of the non-anchor PRB from the anchor PRB and a second offset indication, wherein the second offset indication is used for indicating whether the non-anchor PRB, when compared with the anchor PRB, is in a higher frequency band or lower frequency band.

In one embodiment, the PRB already used as an anchor PRB is in a guard band.

In one embodiment, the transceiver receives, from the base station, an offset of a central frequency of the anchor PRB from an LTE central frequency,
wherein the received configuration information comprises:
an offset of the non-anchor PRB from the Middle PRB of LTE and a first offset indication, wherein the first offset indication is used for indicating whether the non-anchor PRB, when compared with the Middle PRB of LTE, is in a higher frequency band or lower frequency band; or
a non-anchor PRB number, or
an offset of the non-anchor PRB from the anchor PRB.

According to another aspect of the present invention, a method for configuring a non-anchor physical resource block (PRB) executed at a base station is provided, comprising:
configuring a non-anchor PRB for a user equipment (UE) for unicast data transmission, wherein the non-anchor PRB is selected from a set of Long Term Evolution (LTE) guard band PRBs; and
sending to the UE configuration information of the non-anchor PRB.

In one embodiment, the guard band PRBs are those represented in a manner of dividing a guard band according to offsets of central frequencies thereof relative to an LTE central frequency sequentially in ascending order, or PRBs in the guard band represented in a manner of being offset by specific numbers of PRBs relative to a reference anchor PRB, or PRBs in the guard band capable of being used as anchor PRBs.

In one embodiment, the PRB already used as an anchor PRB is an LTE in-band PRB.

In one embodiment, when a PCI of a cell where the anchor PRB locates is the same as a PCI of a corresponding LTE cell, the step of configuring a non-anchor PRB comprises:

configuring for the UE: an offset of the non-anchor PRB from an Middle PRB of LTE and a first offset indication, wherein the Middle PRB of LTE is a PRB in the middle of an LTE bandwidth, and the first offset indication is used for indicating whether the non-anchor PRB, when compared with the Middle PRB of LTE, is in a higher frequency band or lower frequency band; or an offset of the non-anchor PRB from the anchor PRB and a second offset indication, wherein the second offset indication is used for indicating whether the non-anchor PRB, when compared with the anchor PRB, is in a higher frequency band or lower frequency band; or an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency bands; or an offset of a central frequency of the non-anchor PRB from the LTE central frequency.

In one embodiment, when a PCI of a cell where the anchor PRB locates is different from a PCI of a corresponding LTE cell, the method further comprises:

sending to the UE an offset of the anchor PRB from an Middle PRB of LTE, wherein the Middle PRB of LTE is a PRB in the middle of an LTE bandwidth, wherein the step of configuring a non-anchor PRB comprises:

configuring for the UE:

an offset of the non-anchor PRB from an Middle PRB of LTE and a first offset indication, wherein the Middle PRB of LTE is a PRB in the middle of an LTE bandwidth, and the first offset indication is used for indicating whether the non-anchor PRB, when compared with the Middle PRB of LTE, is in a higher frequency band or lower frequency band; or an offset of the non-anchor PRB from the anchor PRB and a second offset indication, wherein the second offset indication is used for indicating whether the non-anchor PRB, when compared with the anchor PRB, is in a higher frequency band or lower frequency band; or an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency band|; or an offset of a central frequency of the non-anchor PRB from the LTE central frequency.

In one embodiment, the PRB already used as an anchor PRB is in a guard band.

In one embodiment, the method further comprises:

sending to the UE an offset of a central frequency of the anchor PRB from an LTE central frequency, wherein the step of configuring a non-anchor PRB comprises:

configuring for the UE:

an offset of the non-anchor PRB from the Middle PRB of LTE and a first offset indication, wherein the first offset indication is used for indicating whether the non-anchor PRB, when compared with the Middle PRB of LTE, is in a higher frequency band or lower frequency band; or an offset of the non-anchor PRB from the anchor PRB and a second offset indication, wherein the second offset indication is used for indicating whether the non-anchor PRB, when compared with the anchor PRB, is in a higher frequency band or lower frequency band; or an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency band|; or an offset of a central frequency of the non-anchor PRB from the LTE central frequency.

According to another aspect of the present invention, a base station is provided, comprising:

a configuration unit, configured to configure a non-anchor PRB for a user equipment (UE) for unicast data transmission, wherein the non-anchor PRB is selected from a set of Long Term Evolution (LTE) guard band PRBs; and a transceiver, configured to send to the UE configuration information of the non-anchor PRB.

In one embodiment, the guard band PRBs are those represented in a manner of dividing a guard band according to offsets of central frequencies thereof relative to an LTE central frequency sequentially in ascending order, or PRBs in the guard band represented in a manner of being offset by specific numbers of PRBs relative to a reference anchor PRB, or PRBs in the guard band capable of being used as anchor PRBs.

In one embodiment, the PRB already used as an anchor PRB is an LTE in-band PRB.

In one embodiment, when a PCI of a cell where the anchor PRB locates is the same as a PCI of a corresponding LTE cell, the configuration unit is configured to:

configure for the UE: an offset of the non-anchor PRB from an Middle PRB of LTE and a first offset indication, wherein the Middle PRB of LTE is a PRB in the middle of an LTE bandwidth, and the first offset indication is used for indicating whether the non-anchor PRB, when compared with the Middle PRB of LTE, is in a higher frequency band or lower frequency band; or an offset of the non-anchor PRB from the anchor PRB and a second offset indication, wherein the second offset indication is used for indicating whether the non-anchor PRB, when compared with the anchor PRB, is in a higher frequency band or lower frequency band; or an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency band|; or an offset of a central frequency of the non-anchor PRB from the LTE central frequency.

In one embodiment, when a PCI of a cell where the anchor PRB locates is different from a PCI of a corresponding LTE cell, the transceiver sends to the UE an offset of the anchor PRB from an Middle PRB of LTE, wherein the Middle PRB of LTE is a PRB in the middle of an LTE bandwidth; and
wherein the configuration unit is configured to:
configure for the UE:
an offset of the non-anchor PRB from an Middle PRB of LTE and a first offset indication, wherein the Middle PRB of LTE is a PRB in the middle of an LTE bandwidth, and the first offset indication is used for indicating whether the non-anchor PRB, when compared with the Middle PRB of LTE, is in a higher frequency band or lower frequency band; or
an offset of the non-anchor PRB from the anchor PRB and a second offset indication, wherein the second offset indication is used for indicating whether the non-anchor PRB, when compared with the anchor PRB, is in a higher frequency band or lower frequency band; or
an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency band|; or
an offset of a central frequency of the non-anchor PRB from the LTE central frequency.

In one embodiment, the PRB already used as an anchor PRB is in a guard band.

In one embodiment, the transceiver sends to the UE an offset of a central frequency of the anchor PRB from an LTE central frequency; and
wherein the configuration unit is configured to:
configure for the UE:
an offset of the non-anchor PRB from the Middle PRB of LTE and a first offset indication, wherein the first offset indication is used for indicating whether the non-anchor PRB, when compared with the Middle PRB of LTE, is in a higher frequency band or lower frequency band; or
an offset of the non-anchor PRB from the anchor PRB and a second offset indication, wherein the second offset indication is used for indicating whether the non-anchor PRB, when compared with the anchor PRB, is in a higher frequency band or lower frequency band; or
an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency band|; or
an offset of a central frequency of the non-anchor PRB from the LTE central frequency.

According to another aspect of the present invention, a method for determining a position of a non-anchor physical resource block (PRB) executed at a user equipment (UE) is provided, comprising:
receiving, from a base station, configuration information of a non-anchor PRB configured for the UE for unicast data transmission;
determining, based on the configuration information, a location of the non-anchor PRB in a set of Long Term Evolution (LTE) guard band PRBs; and
performing unicast data transmission on the non-anchor PRB.

In one embodiment, the guard band PRBs are those represented in a manner of dividing a guard band according to offsets of central frequencies thereof relative to an LTE central frequency sequentially in ascending order, or PRBs in the guard band represented in a manner of being offset by specific numbers of PRBs relative to a reference anchor PRB.

In one embodiment, the PRB already used as an anchor PRB is an LTE in-band PRB.

In one embodiment, when a PCI of a cell where the anchor PRB locates is the same as a PCI of a corresponding LTE cell, the received configuration information comprises:
an offset of the non-anchor PRB from an Middle PRB of LTE and a first offset indication, wherein the Middle PRB of LTE is a PRB in the middle of an LTE bandwidth, and the first offset indication is used for indicating whether the non-anchor PRB, when compared with the Middle PRB of LTE, is in a higher frequency band or lower frequency band; or
an offset of the non-anchor PRB from the anchor PRB and a second offset indication, wherein the second offset indication is used for indicating whether the non-anchor PRB, when compared with the anchor PRB, is in a higher frequency band or lower frequency band; or
an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency band|; or
an offset of a central frequency of the non-anchor PRB from the LTE central frequency.

In one embodiment, when a PCI of a cell where the anchor PRB locates is different from a PCI of a corresponding LTE cell, the method further comprises:
receiving, from the base station, an offset of the anchor PRB from an Middle PRB of LTE, wherein the Middle PRB of LTE is a PRB in the middle of an LTE bandwidth,
wherein the received configuration information comprises:
an offset of the non-anchor PRB from an Middle PRB of LTE and a first offset indication, wherein the Middle PRB of LTE is a PRB in the middle of an LTE bandwidth, and the first offset indication is used for indicating whether the non-anchor PRB, when compared with the Middle PRB of LTE, is in a higher frequency band or lower frequency band; or
an offset of the non-anchor PRB from the anchor PRB and a second offset indication, wherein the second offset indication is used for indicating whether the non-anchor PRB, when compared with the anchor PRB, is in a higher frequency band or lower frequency band; or
an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency band|; or
an offset of a central frequency of the non-anchor PRB from the LTE central frequency.

In one embodiment, the PRB already used as an anchor PRB is in a guard band.

In one embodiment, the method further comprises:
receiving, from the base station, an offset of a central frequency of the anchor PRB from an LTE central frequency, wherein the received configuration information comprises:
an offset of the non-anchor PRB from the Middle PRB of LTE and a first offset indication, wherein the first offset indication is used for indicating whether the non-anchor PRB, when compared with the Middle PRB of LTE, is in a higher frequency band or lower frequency band; or
an offset of the non-anchor PRB from the anchor PRB and a second offset indication, wherein the second of et indication is used for indicating whether the non-anchor PRB, when compared with the anchor PRB, is in a higher frequency band or lower frequency band; or
an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency band|; or
an offset of a central frequency of the non-anchor PRB from the LTE central frequency.

According to another aspect of the present invention, a user equipment (UE) is provided, comprising:
a transceiver, configured to receive, from a base station, configuration information of a non-anchor PRB configured for the UE for unicast data transmission; and perform unicast data transmission on the non-anchor PRB; and
a determining unit, configured to determine, based on the configuration information, a location of the non-anchor PRB in a set of Long Term Evolution (LTE) guard band PRBs.

In one embodiment, the guard band PRBs are those represented in a manner of dividing a guard band according to offsets of central frequencies thereof relative to an LTE central frequency sequentially in ascending order, or PRBs in the guard band represented in a manner of being offset by specific numbers of PRBs relative to a reference anchor PRB.

In one embodiment, the PRB already used as an anchor PRB is an LTE in-band PRB.

In one embodiment, when a PCI of a cell where the anchor PRB locates is the same as a PCI of a corresponding LTE cell, the received configuration information comprises:
an offset of the non-anchor PRB from an Middle PRB of LTE and a first offset indication, wherein the Middle PRB of LTE is a PRB in the middle of an LTE bandwidth, and the first offset indication is used for indicating whether the non-anchor PRB, when compared with the Middle PRB of LTE, is in a higher frequency band or lower frequency band; or
an offset of the non-anchor PRB from the anchor PRB and a second offset indication, wherein the second offset indication is used for indicating whether the non-anchor PRB, when compared with the anchor PRB, is in a higher frequency band or lower frequency band; or
an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency band|; or
an offset of a central frequency of the non-anchor PRB from the LTE central frequency.

In one embodiment, when a PCI of a cell where the anchor PRB locates is different from a PCI of a corresponding LTE cell, the transceiver receives, from the base station, an offset of the anchor PRB from an Middle PRB of LTE, wherein the Middle PRB of LTE is a PRB in the middle of an LTE bandwidth,
wherein the received configuration information comprises:
an offset of the non-anchor PRB from an Middle PRB of LTE and a first offset indication, wherein the Middle PRB of LTE is a PRB in the middle of an LTE bandwidth, and the first offset indication is used for indicating whether the non-anchor PRB, when compared with the Middle PRB of LTE, is in a higher frequency band or lower frequency band; or
an offset of the non-anchor PRB from the anchor PRB and a second offset indication, wherein the second offset indication is used for indicating whether the non-anchor PRB, when compared with the anchor PRB, is in a higher frequency band or lower frequency band; or
an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency band|; or
an offset of a central frequency of the non-anchor PRB from the LTE central frequency.

In one embodiment, the PRB already used as an anchor PRB is in a guard band.

In one embodiment, the transceiver receives, from the base station, an offset of a central frequency of the anchor PRB from an LTE central frequency,
wherein the received configuration information comprises:
an offset of the non-anchor PRB from the Middle PRB of LTE and a first offset indication, wherein the first offset indication is used for indicating whether the non-anchor PRB, when compared with the Middle PRB of LTE, is in a higher frequency band or lower frequency band; or
an offset of the non-anchor PRB from the anchor PRB and a second offset indication, wherein the second offset indication is used for indicating whether the non-anchor PRB, when compared with the anchor PRB, is in a higher frequency band or lower frequency band; or
an offset of the non-anchor PRB from the reference anchor PRB and a third offset indication as well as an offset of a central frequency of the reference anchor PRB from the LTE central frequency, wherein the third offset indication is used for indicating whether the non-anchor PRB, when compared with the reference anchor PRB, is in a higher frequency band or lower frequency band|; or
an offset of a central frequency of the non-anchor PRB from the LTE central frequency.

According to another aspect of the present invention, a method for configuring a non-anchor physical resource block (PRB) executed at a base station is provided, comprising:
configuring a non-anchor PRB for a user equipment (UE) for unicast data transmission, wherein the non-anchor PRB is selected from a set of PRBs in a frequency band suitable for a stand-alone mode of operation; and sending to the UE configuration information of the non-anchor PRB.

In one embodiment, the PRBs in the frequency band suitable for the stand-alone mode of operation are PRBs represented in a manner of dividing subcarriers according to frequencies in ascending order in the frequency band suitable for the stand-alone mode of operation, or PRBs represented in a manner of being offset by specific numbers of PRBs relative to a reference anchor PRB in the frequency band suitable for the stand-alone mode of operation.

In one embodiment, the PRB already used as an anchor PRB is a PRB in the frequency band suitable for the stand-alone mode of operation.

In one embodiment, the step of configuring a non-anchor PRB comprises:

configuring for the UE an offset of the non-anchor PRB from the anchor PRB and a first offset indication, wherein the first offset indication is used for indicating whether the non-anchor PRB, when compared with the anchor PRB, is in a higher frequency band or lower frequency band.

In one embodiment, the method further comprises:

sending to the UE an anchor PRB number, wherein the step of configuring a non-anchor PRB comprises: configuring for the UE a non-anchor PRB number.

In one embodiment, the method further comprises:

sending to the UE system bandwidth indication information, an offset of the anchor PRB from a stand-alone mode of operation system bandwidth central PRB, and a second offset indication, wherein the second offset indication is used for indicating whether the anchor PRB, when compared with the stand-alone mode of operation system bandwidth central PRB, is in a higher frequency band or lower frequency band, wherein the step of configuring a non-anchor PRB comprises: configuring for the UE a non-anchor PRB number.

In one embodiment, the method further comprises:

sending to the UE an offset of the anchor PRB from a stand-alone mode of operation system bandwidth central PRB, and a second offset indication, wherein the second offset indication is used for indicating whether the anchor PRB, when compared with the stand-alone mode of operation system bandwidth central PRB, is in a higher frequency band or lower frequency band, wherein the step of configuring a non-anchor PRB comprises: configuring for the UE an offset of the non-anchor PRB from the stand-alone mode of operation system bandwidth central PRB and a third offset indication, wherein the third offset indication is used for indicating whether the non-anchor PRB, when compared with the stand-alone mode of operation system bandwidth central PRB, is in a higher frequency band or lower frequency band.

According to another aspect of the present invention, a base station is provided, comprising:

a configuration unit, configured to configure a non-anchor PRB for a user equipment (UE) for unicast data transmission, wherein the non-anchor PRB is selected from a set of PRBs in a frequency band suitable for a stand-alone mode of operation; and a transceiver, configured to send to the UE configuration information of the non-anchor PRB.

In one embodiment, the PRBs in the frequency band of the stand-alone mode of operation are PRBs represented in a manner of dividing subcarriers according to frequencies in ascending order in the frequency band suitable for the stand-alone mode of operation, or PRBs represented in a manner of being offset by specific numbers of PRBs relative to a reference anchor PRB in the frequency band suitable for the stand-alone mode of operation.

In one embodiment, the PRB already used as an anchor PRB is a PRB in the frequency band suitable for the stand-alone mode of operation.

In one embodiment, the configuration unit is configured to:

configure for the UE an offset of the non-anchor PRB from the anchor PRB and a first offset indication, wherein the first offset indication is used for indicating whether the non-anchor PRB, when compared with the anchor PRB, is in a higher frequency band or lower frequency band.

In one embodiment, the transceiver sends to the UE an anchor PRB number, wherein the configuration unit is configured to: configure for the UE a non-anchor PRB number.

In one embodiment, the transceiver sends to the UE system bandwidth indication information, an offset of the anchor PRB from a stand-alone mode of operation system bandwidth central PRB, and a second offset indication, wherein the second offset indication is used for indicating whether the anchor PRB, when compared with the stand-alone mode of operation system bandwidth central PRB, is in a higher frequency band or lower frequency band, wherein the configuration unit is configured to: configure for the UE a non-anchor PRB number.

In one embodiment, the transceiver sends to the UE an offset of the anchor PRB from a stand-alone mode of operation system bandwidth central PRB, and a second offset indication, wherein the second offset indication is used for indicating whether the anchor PRB, when compared with the stand-alone mode of operation system bandwidth central PRB, is in a higher frequency band or lower frequency band, wherein the configuration unit is configured to: configure for the UE an offset of the non-anchor PRB from the stand-alone mode of operation system bandwidth central PRB and a third offset indication, wherein the third offset indication is used for indicating whether the non-anchor PRB, when compared with the stand-alone mode of operation system bandwidth central PRB, is in a higher frequency band or lower frequency band.

According to another aspect of the present invention, a method for determining a position of a non-anchor physical resource block (PRB) executed at a user equipment (UE) is provided, comprising:

receiving, from a base station, configuration information of a non-anchor PRB configured for the UE for unicast data transmission;

determining, based on the configuration information, a location of the non-anchor PRB in a set of PRBs in a frequency band suitable for a stand-alone mode of operation; and performing unicast data transmission on the non-anchor PRB.

In one embodiment, the PRBs in the frequency band of the stand-alone mode of operation are PRBs represented in a manner of dividing subcarriers according to frequencies in ascending order in the frequency band suitable for the stand-alone mode of operation, or PRBs represented in a manner of being offset by specific numbers of PRBs relative to a reference anchor PRB in the frequency band suitable for the stand-alone mode of operation.

In one embodiment, the PRB already used as an anchor PRB is a PRB in the frequency band suitable for the stand-alone mode of operation.

In one embodiment, the received configuration information comprises:

an offset of the non-anchor PRB from the anchor PRB and a first offset indication, wherein the first offset indication is used for indicating whether the non-anchor PRB, when compared with the anchor PRB, is in a higher frequency band or lower frequency band.

In one embodiment, the method further comprises:

receiving, from the base station, an anchor PRB number, wherein the received configuration information comprises: a non-anchor PRB number.

In one embodiment, the method further comprises:

receiving, from the base station, system bandwidth indication information, an offset of the anchor PRB from a stand-alone mode of operation system bandwidth central PRB, and a second offset indication, wherein the second offset indication is used for indicating whether the anchor PRB, when compared with the stand-alone mode of operation system bandwidth central PRB, is in a higher frequency band or lower frequency band, wherein the received configuration information comprises: a non-anchor PRB number.

In one embodiment, the method further comprises:

receiving, from the base station, an offset of the anchor PRB from a stand-alone mode of operation system bandwidth central PRB, and a second offset indication, wherein the second offset indication is used for indicating whether the anchor PRB, when compared with the stand-alone mode of operation system bandwidth central PRB, is in a higher frequency band or lower frequency band, wherein the received configuration information comprises: an offset of the non-anchor PRB from the stand-alone mode of operation system bandwidth central PRB and a third offset indication, wherein the third offset indication is used for indicating whether the non-anchor PRB, when compared with the stand-alone mode of operation system bandwidth central PRB, is in a higher frequency band or lower frequency band.

According to another aspect of the present invention, a user equipment (UE) is provided, comprising:

a transceiver, configured to receive, from a base station, configuration information of a non-anchor PRB configured for the UE for unicast data transmission; and perform unicast data transmission on the non-anchor PRB; and a determining unit, configured to determine, based on the configuration information, a location of the non-anchor PRB in a set of PRBs in a frequency band suitable for a stand-alone mode of operation.

In one embodiment, the PRBs in the frequency band of the stand-alone mode of operation are PRBs represented in a manner of dividing subcarriers according to frequencies in ascending order in the frequency band suitable for the stand-alone mode of operation, or PRBs represented in a manner of being offset by specific numbers of PRBs relative to a reference anchor PRB in the frequency band suitable for the stand-alone mode of operation.

In one embodiment, the PRB already used as an anchor PRB is a PRB in the frequency band suitable for the stand-alone mode of operation.

In one embodiment, the received configuration information comprises:

an offset of the non-anchor PRB from the anchor PRB and a first offset indication, wherein the first offset indication is used for indicating whether the non-anchor PRB, when compared with the anchor PRB, is in a higher frequency band or lower frequency band.

In one embodiment, the transceiver receives, from the base station, an anchor PRB number, wherein the received configuration information comprises: a non-anchor PRB number.

In one embodiment, the transceiver receives, from the base station, system bandwidth indication information, an offset of the anchor PRB from a stand-alone mode of operation system bandwidth central PRB, and a second offset indication, wherein the second offset indication is used for indicating whether the anchor PRB, when compared with the stand-alone mode of operation system bandwidth central PRB, is in a higher frequency band or lower frequency band, wherein the received configuration information comprises: a non-anchor PRB number.

In one embodiment, the transceiver receives, from the base station, an offset of the anchor PRB from a stand-alone mode of operation system bandwidth central PRB, and a second offset indication, wherein the second offset indication is used for indicating whether the anchor PRB, when compared with the stand-alone mode of operation system bandwidth central PRB, is in a higher frequency band or lower frequency band, wherein the received configuration information comprises: an offset of the non-anchor PRB from the stand-alone mode of operation system bandwidth central PRB and a third offset indication, wherein the third offset indication is used for indicating whether the non-anchor PRB, when compared with the stand-alone mode of operation system bandwidth central PRB, is in a higher frequency band or lower frequency band.

BRIEF DESCRIPTION OF DRAWINGS

The above and other features of the present invention will be more pronounced through the following detailed description taken in conjunction with the accompanying drawings.

FIG. 5 is a flowchart of a method executed at a base station according to a first exemplary embodiment of the present invention;

FIG. 6 is a flowchart of a method executed at a UE according to the first exemplary embodiment of the present invention;

FIG. 10 is a flowchart of a method executed at a base station according to a second exemplary embodiment of the present invention;

FIG. 11 is a flowchart of a method executed at a UE according to the second exemplary embodiment of the present invention;

FIG. 15 is a flowchart of a method executed at a base station according to a third exemplary embodiment of the present invention;

DETAILED DESCRIPTION OF EMBODIMENTS

Figure 1:
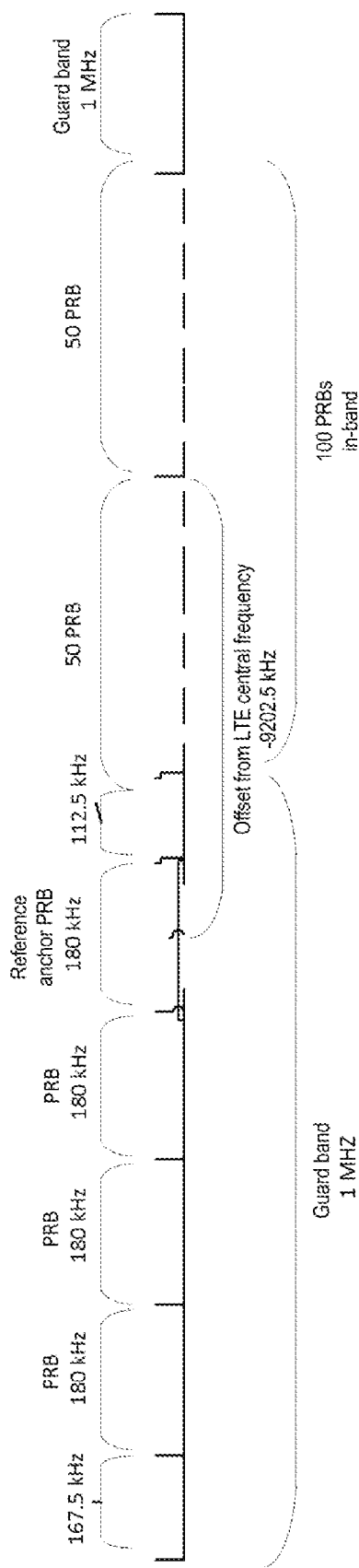
FIG. 1 illustrates a schematic diagram of dividing guard band PRBs with reference to a reference anchor PRB at a bandwidth of, for example, 20 MHz.

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

Multiple embodiments according to the present invention are specifically described below, with an LTE mobile communications system and its subsequently evolved version serving as exemplary application environments, and with a base station and a user equipment that support NB-IOT serving as examples. However, it should be noted that the present invention is not limited to the following embodiments, but is applicable to other wireless communications systems, such as a future 5G cellular communications system, and is applicable to other base stations and user equipments, such as base stations and user equipments supporting eMTC, MMTC, and so on.

Prior to the description of the technical solutions of the present invention, the terms used in the present invention are defined as follows. Unless otherwise specified, the terms involved in the present invention are defined herein.

Guard band: it refers to an LTE guard band; unless otherwise specified in the present invention, the guard band includes guard bands on two sides. Specific explanation will be provided when it needs to be specifically indicated that the guard band is a guard band on a single side.

LTE PRBs: they refer to LTE in-band PRBs; that is, PRBs defined in 3GPP Release 12 and previous releases, but do not include PRBs in the guard band.

Guard band PRBs: they refer to PRBs obtained by continuously dividing the guard band in the unit of a predetermined frequency band interval (for example, 180 kHz) starting from a subcarrier close to the in-band; that is, for the guard band lower than an LTE central frequency, the guard band is continuously divided into PRBs according to frequencies in descending order, for the guard band higher than the LTE central frequency, the guard band is continuously divided into PRBs according to frequencies in ascending order.

LTE PRB numbers: they refer to PRB numbers obtained according to the PRBs and numbering method defined in 3GPP Release 12 and previous releases, i.e., PRB numbers obtained by sequentially numbering in-band PRBs according to frequencies in ascending order.

Middle PRB of LTE: it refers to a PRB in the middle of an LTE bandwidth; when the bandwidth contains an even number of PRBs, either of the two PRBS in the middle may be set as the middle PRB of LTE. For example, when the bandwidth is 20 MHz (110 PRBs, with 100 PRBs in-band and 5 PRBs in the guard band of each side), the 100 PRBs in-band are sequentially numbered according to frequencies in ascending order to obtain LTE PRB numbers 0-99. In the middle are two LTE PRBs, namely, PRBs having LTE PRB numbers 49 and 50; and the LTE PRB having the LTE PRB number 50 may be used as the middle PRB of LTE.

LTE central frequency: the LTE central frequency is the central frequency corresponding to the specific LTE bandwidth frequency range.

Anchor PRB set: it refers to a set of LTE PRBs capable of being used as anchor PRBs in an in-band mode of operation as specified in the 3GPP standard. All the PRBs in the set can be used as anchor PRBs; but only PRBs that have sent information, such as a PSS/SSS, PBCH, or SIB, can be used for UE access and thus become anchor PRBs. Table 1 shows an example of LTE PRB numbers capable of being used as in-band anchor PRBs when the bandwidth is 3 MHz, 5 MHz, 10 MHz, 15 MHz, and 20 MHz, wherein ranster offsets at 3 MHz, 5 MHz, and 15 MHz are +/−7.5 kHz, and raster offsets at 10 MHz and 20 MHz are +/−2.5 kHz. It should be noted that the method given in the present invention is not limited to the anchor PRB sets shown in Table 1.

TABLE 1

| | LTE system bandwidth | | | | |
|---|---|---|---|---|---|
| | 3 MHz | 5 MHz | 10 MHz | 15 MHz | 20 MHz |
| LTE PRB number (with a raster offset of 2.5 kHz) | / | / | 4, 9, 14, 19, 30, 35, 40, 45 | / | 4, 9, 14, 19, 24, 29, 34, 39, 44, 55, 60, 65, 70, 75, 80, 85, 90, 95 |
| LTB PRB number (with a raster offset of 7.5 kHz) | 2, 12 | 2, 7, 17, 22 | / | 2, 7, 12, 17, 22, 27, 32, 42, 47, 52, 57, 62, 67, 72 | / |

As shown in Table 1, when the bandwidth is 3 MHz, the anchor PRB set includes two PRBs having LTE PRB numbers 2 and 12; that is, only these two LTE PRBs can be used as anchor PRBs when the bandwidth is 3 MHz.

Anchor PRB central frequency offset set: it refers to a set of offsets of central frequencies of PRBs capable of being used as anchor PRBs in a guard-band mode of operation as specified in the 3GPP standard from the LTE central frequency. All the PRBs whose central frequencies and the LTE central frequency satisfy the offset values can be used as anchor PRBs, but only PRBs that have sent information, such as a PSS/SSS, PBCH, or SIB, can be used for UE access and thus become anchor PRBs. Table 2 shows an example of offsets of central frequencies of PRBs capable of being used as anchor PRBs in the guard band from the LTE central frequency when the bandwidth is 5 MHz, 10 MHz, 15 MHz, and 20 MHz.

TABLE 2

| | LTE system bandwidth | | | |
|---|---|---|---|---|
| | 5 MHz | 10 MHz | 15 MHz | 20 MHz |
| Offset (kHz) of central frequency of anchor PRB from LTE central frequency | ±2392.5 | ±4597.5/4702.5/ 4807.5/4897.5 | ±6892.5/6997.5/ 7102.5/7207.5/ 7297.5/7402.5 | ±9097.5/9202.5/ 9307.5/9397.5/9502.5/ 9607.5/9697.5/9802.5/ 9907.5 |

As shown in Table 2, when the bandwidth is 5 MHz, the anchor PRB central frequency offset set includes two PRBs whose central frequencies are offset from the LTE central frequency by 2392.5 kHz or −2392.5 kHz; that is, only these two PRBs can be used as anchor PRBs when the bandwidth is 5 MHz. It should be noted that the method given in the present invention is not limited to the anchor PRB central frequency offset sets shown in Table 2.

Reference anchor PRB: an offset value of a central frequency of a reference anchor PRB from the LTE central frequency is a certain element in the anchor PRB central frequency offset set; and the guard band on that side of the reference anchor PRB is divided into multiple PRBs with reference to the reference anchor PRB; that is, for a guard band subcarrier lower than a central frequency of the reference anchor PRB, the guard band is divided into PRBs according to frequencies in descending order; for a guard band subcarrier higher than the central frequency of the reference anchor PRB, the guard band is divided into PRBs according to frequencies in ascending order. FIG. 1 is a schematic diagram illustrating division of a guard band on that side of a reference anchor PRB into PRBs with reference to a reference anchor PRB at a bandwidth of, for example, 20 MHz. The reference anchor PRB shown in FIG. 1 is a PRB whose central frequency is offset from the LTE central frequency by −9202.5 kHz, and the guard band is divided into 4 PRBs with reference to the reference anchor PRB.

Reference anchor PRB set: it refers to a set of PRBs obtained by dividing the guard band on the single side using the reference anchor PRB. For example, FIG. 1 shows that the reference anchor PRB set obtained by dividing the guard band using the PRB whose central frequency is offset from the LTE central frequency by −9202.5 kHz as the reference anchor PRB includes 4 PRBs.

Figure 2:
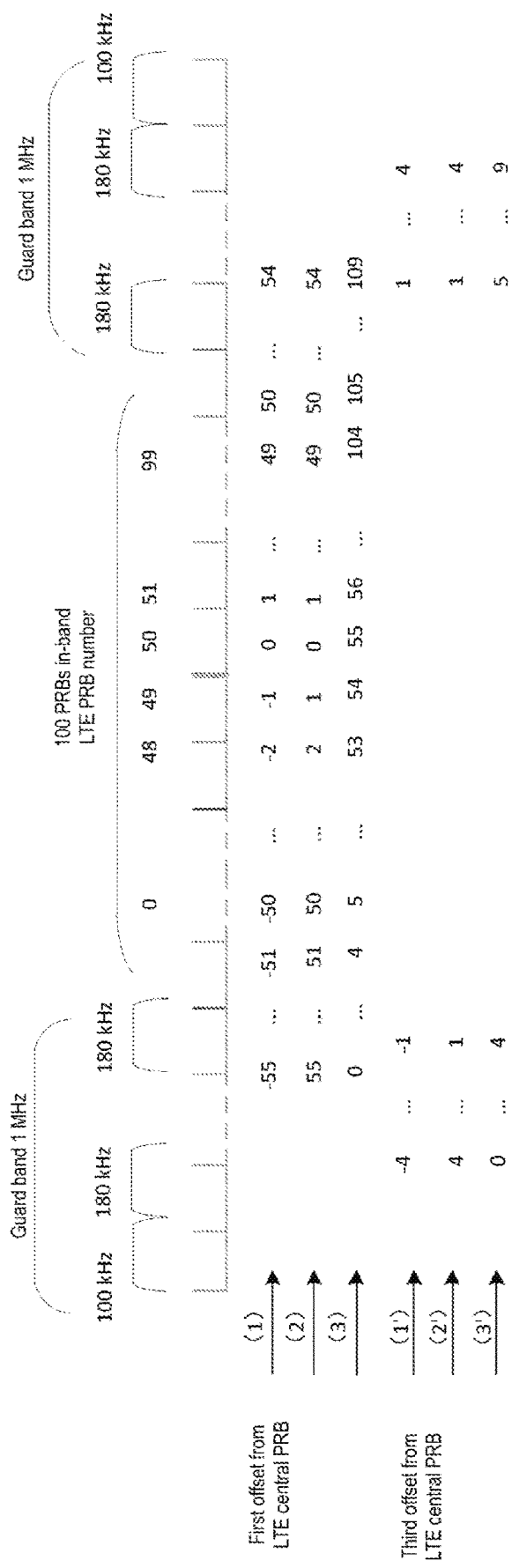
FIG. 2 is a schematic diagram illustrating numbering of LTE PRBs and guard band PRBs based on first offsets from an Middle PRB of LTE at a bandwidth of, for example, 20 MHz and numbering of guard band PRBs based on third offsets from the Middle PRB of LTE at a bandwidth of, for example, 20 MHz respectively.

First offset from middle PRB of LTE: the LTE PRBs and the guard band PRBs are sequentially numbered according to deviations from the middle PRB of LTE in a predefined order, and the numbers are first offsets from the middle PRB of LTE. For example, the arrows (1), (2), and (3) corresponding to the part "First offset from middle PRB of LTE" in FIG. 2 show three manners of numbering the LTE PRBs and the guard band PRBs according to offsets from the middle PRB of LTE in ascending order when the bandwidth is 20 MHz; and the numbers are first offsets of the LTE PRBs and the guard band PRBs from the middle PRB of LTE. As shown in FIG. 2, the manner (1) is sequentially numbering, based on offsets from the middle PRB of LTE, the LTE PRBs and the guard band PRBs from the middle PRB of LTE to the low frequency side and the high frequency side respectively, wherein the numbers on the low frequency side are negative, and the numbers on the high frequency side are positive; the manner (2) is sequentially numbering, based on offsets from the middle PRB of LTE, the LTE PRBs and the guard band PRBs from the middle PRB of LTE to the low frequency side and the high frequency side, wherein the numbers on both the low frequency side and the high frequency side are positive; and the manner (3) is sequentially numbering the LTE PRBs and the guard band PRBs from low frequencies to high frequencies.

Second offset from middle PRB of LTE: the PRBs in the anchor PRB set are sequentially numbered according to deviations from the middle PRB of LTE in a predefined order, and the numbers are second offsets from the middle PRB of LTE. Table 3 shows an example in which when the bandwidth is 3/5/10/15/20 MHz and a PCI of a cell where an anchor PRB locates is the same as a PCI of a corresponding LTE cell, the PRBs in the anchor PRB set are uniformly numbered; and the numbers are second offsets of the PRBs in the anchor PRB set from the LTE PRB. The 2nd and 4th columns of Table 3 are first offsets from the middle PRB of LTE. It should be noted that the method described in the present invention is not limited to the numbering manner shown in Table 3; the method may be applied to other numbering manners.

TABLE 3

| Second offset from middle PRB of LTE | Raster offset +/− 7.5 kHz (3/5/15 MHz) | Second offset from middle PRB of LTE | Raster offset +/− 2.5 kHz (10/20 MHz) |
|---|---|---|---|
| 0 | −35 | 14 | −46 |
| 1 | −30 | 15 | −41 |
| 2 | −25 | 16 | −36 |
| 3 | −20 | 17 | −31 |
| 4 | −15 | 18 | −26 |
| 5 | −10 | 19 | −21 |
| 6 | −5 | 20 | −16 |
| 7 | 5 | 21 | −11 |
| 8 | 10 | 22 | −6 |
| 9 | 15 | 23 | 5 |
| 10 | 20 | 24 | 10 |
| 11 | 25 | 25 | 15 |
| 12 | 30 | 26 | 20 |
| 13 | 35 | 27 | 25 |
| | | 28 | 30 |
| | | 29 | 35 |
| | | 30 | 40 |
| | | 31 | 45 |

In the guard-band mode of operation or in-band mode of operation and when a PCI of a cell where an anchor PRB locates is different from a PCI of a corresponding LTE cell, a corresponding anchor PRB set and anchor PRB central frequency offset set may be determined according to raster offset information broadcast by a base station in an MIB.

TABLE 4

| Raster offset | Mode of operation | 3 MHz | 5 MHz | 10 MHz | 15 MHz | 20 MHz |
|---|---|---|---|---|---|---|
| −2.5 kHz | In-band mode of operation | | | 30, 35, 40, 45, | | 55, 60, 65, 79, 75, 80, 85, 90, 95, |
| | Guard-band mode of operation | | | +4597.5/−4702.5/ +4897.5 | +6997.5/−7102.5/ +7297.5/−7402.5 | +9097.5/−9202.5/ +9397.5/−9502.5/ +9697.5/−9802.5 |
| +2.5 kHz | In-band mode of operation | | | 4, 9, 14, 19, | | 4, 9, 14, 19, 24, 29, 34, 39, 44, |
| | Guard-band mode of operation | | | −4597.5/+4702.5/ −4897.5 | −6997.5/+7102.5/ −7297.5/+7402.5 | −9097.5/+9202.5/ −9397.5/+9502.5/ −9697.5/+9802.5 |
| −7.5 kHz | In-band mode of operation | 2 | 2, 7 | | 2, 7, 12, 17, 22, 27, 32, | |
| | Guard-band mode of operation | | +2392.5 | −4807.5 | +6892.5/−7207.5 | −9307.5/−9607.5/ −9907.5 |
| +7.5 kHz | In-band mode of operation | 12 | 22, 17 | | 42, 47, 52, 57, 62, 67, 72, | |
| | Guard-band mode of operation | | −2392.5 | +4807.5 | −6892.5/+7207.5 | +9307.5/+9607.5/ +9907.5 |

Table 4 shows corresponding anchor PRB sets at bandwidths of 10 MHz and 20 MHz with raster offsets of +/−2.5 kHz and at bandwidths of 3 MHz, 5 MHz, and 15 MHz with raster offsets of +/−7.5 kHz; and corresponding anchor PRB central frequency offset sets at bandwidths of 5/10/15/20 MHz with raster offsets of +/−2.5 kHz and +/−7.5 kHz.

The difference between using the anchor PRB sets and anchor PRB central frequency offset sets shown in Table 4 and using the anchor PRB sets and anchor PRB central frequency offset sets shown in Table 1 and Table 2 lies in that the number of bits required for indicating elements in the sets can be reduced by using the sets defined in Table 4. In all embodiments herein, if an eNB has broadcast raster offset information through an MIB, the eNB may use the sets given in Table 4 when sending relevant information indicating elements in an anchor PRB set and an anchor PRB central frequency offset set.

When a PCI of a cell where an anchor PRB locates is different from a PCI of a corresponding LTE cell, a corresponding anchor PRB set is determined according to raster offset information broadcast by the eNB in an MIB, so that the anchor PRB set can be numbered using numbering manners given in Tables 5-8, and the numbers are second offsets from the LTE central frequency.

Table 5 shows corresponding second offsets from the middle PRB of LTE when the bandwidth is 10/20 MHz and the raster offset is −2.5 kHz.

Table 6 shows corresponding second offsets from the middle PRB of LTE when the bandwidth is 10/20 MHz and the raster offset is +2.5 kHz.

Table 7 shows corresponding second offsets from the middle PRB of LTE when the bandwidth is 5/15 MHz and the raster offset is −7.5 kHz.

Table 8 shows corresponding second offsets from the middle PRB of LTE when the bandwidth is 35/15 MHz and the raster offset is +7.5 kHz.

It should be noted that the methods shown in the embodiments of the present invention are not limited to the numbering manners provided in Tables 5-8; elements in the anchor PRB sets shown in Tables 5-8 may be numbered in any predefined manner and the numbers may be used as second offsets from the middle PRB of LTE.

TABLE 5

| Second offset from middle PRB of LTE | First offset from middle PRB of LTE | LTE PRB number (20 MHz) | LTE PRB number (10 MHz) |
|---|---|---|---|
| 0 | 5 | 55 | 30 |
| 1 | 10 | 60 | 35 |
| 2 | 15 | 65 | 40 |
| 3 | 20 | 70 | 45 |
| 4 | 25 | 75 | |
| 5 | 30 | 80 | |
| 6 | 35 | 85 | |
| 7 | 40 | 90 | |
| 8 | 45 | 95 | |

TABLE 6

| Second offset from middle PRB of LTE | First offset from middle PRB of LTE | LTE PRB number (20 MHz) | LTB PRB number (10 MHz) |
|---|---|---|---|
| 0 | −6 | 44 | 19 |
| 1 | −11 | 39 | 14 |
| 2 | −16 | 34 | 9 |
| 3 | −21 | 29 | 4 |
| 4 | −26 | 24 | |
| 5 | −31 | 19 | |
| 6 | −36 | 14 | |
| 7 | −41 | 9 | |
| 8 | −46 | 4 | |

TABLE 7

| Second offset from middle PRB of LTE | First offset from middle PRB of LTE | LTE PRB number (15 MHz) | LTE PRB number (5 MHz) | LTE PRB number (3 MHz) |
|---|---|---|---|---|
| 0 | −5 | 32 | 7 | 2 |
| 1 | −10 | 27 | 2 | |
| 2 | −15 | 22 | | |
| 3 | −20 | 17 | | |
| 4 | −25 | 12 | | |
| 5 | −30 | 7 | | |
| 6 | −35 | 2 | | |

TABLE 8

| Second offset from middle PRB of LTE | First offset from middle PRB of LTE | LTE PRB number (15 MHz) | LTE PRB number (5 MHz) | LTE PRB number (3 MHz) |
|---|---|---|---|---|
| 0 | 5 | 42 | 22 | 12 |
| 1 | 10 | 47 | 17 | |
| 2 | 15 | 52 | | |
| 3 | 20 | 57 | | |
| 4 | 25 | 62 | | |
| 5 | 30 | 67 | | |
| 6 | 35 | 72 | | |

It should be noted that in the embodiments of the present invention, in the guard-band mode of operation or in-band mode of operation and when a PCI of a cell where an anchor PRB locates is different from a PCI of a corresponding LTE cell, an offset from the middle PRB of LTE may adopt the manner described in Table 3 or may adopt the manner described in Tables 5-8.

Third offset from middle PRB of LTE: the guard band PRBs are sequentially numbered according to deviations from the middle PRB of LTE in a predefined order, and the numbers are third offsets from the middle PRB of LTE. For example, the arrows (1'), (2'), and (3') corresponding to the part "Third offset from middle PRB of LTE" in FIG. 2 show three manners (1), (2'), and (3') of numbering the guard band PRBs according to offsets from the middle PRB of LTE in ascending order when the bandwidth is 20 MHz; and the numbers are third offsets of the guard band PRBs from the middle PRB of LTE. As shown in FIG. 2, the manner (1') is sequentially numbering, based on offsets from the middle PRB of LTE, the guard band PRBs to the low frequency side and the high frequency side respectively, wherein the numbers on the low frequency side are negative, and the numbers on the high frequency side are positive; the manner (2') is sequentially numbering, based on offsets from the middle PRB of LTE, the guard band PRBs to the low frequency side and the high frequency side, wherein the numbers on both the low frequency side and the high frequency side are positive; and the manner (3') is sequentially numbering the guard band PRBs from low frequencies to high frequencies.

First offset from anchor PRB: the number of actual PRBs by which a non-anchor PRB and an anchor PRB are spaced apart.

First offset from anchor PRB: the number of actual PRBs by which a non-anchor PRB and a reference anchor PRB are spaced apart.

Second offset from anchor PRB: PRBs in an anchor PRB set are sequentially numbered according to deviations from the middle PRB of LTE (which should be the central PRB of the GSM system bandwidth in the case of the stand-alone mode of operation); and the numbers are the numbers of PRBs belonging to the anchor PRB set by which a non-anchor PRB and an anchor PRB are spaced apart.

The schematic structure of a base station according to an exemplary embodiment of the present invention will be described below with reference to FIG. 3.

Figure 3:
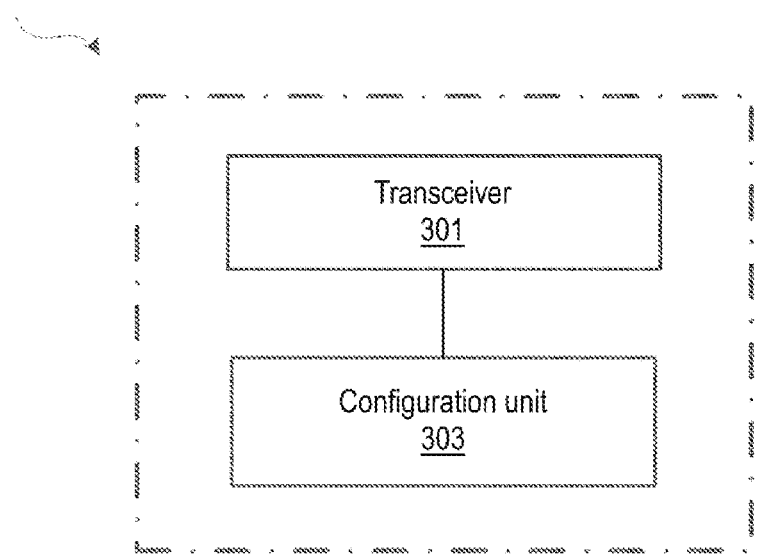
FIG. 3 is a schematic structural diagram of a base station according to an exemplary embodiment of the present invention.

FIG. 3 is a schematic structural diagram of a base station 300 according to an exemplary embodiment of the present invention.

As shown in FIG. 3, the base station 300 includes: a transceiver 301 and a configuration unit 303. The base station 300 may use the configuration unit 303 to configure a non-anchor PRB for a UE for unicast data transmission; and use the transceiver 301 to send configuration information of the non-anchor PRB to the UE, so as to execute methods for configuring a non-anchor physical resource block (PRB) according to various embodiments of the present invention, such as a method 500 shown in FIG. 5, a method 1000 shown in FIG. 10, and a method 1500 shown in FIG. 15 that will be described in details later.

Those skilled in the art should understand that only the transceiver 301 and the configuration unit 303 related to the present invention are shown in the base station 300 of FIG. 3 to avoid confusion of the present invention. However, those skilled in the art should understand that although not shown in FIG. 3, the base station according to the embodiment of the present invention further includes other units that together form the base station.

Figure 4:
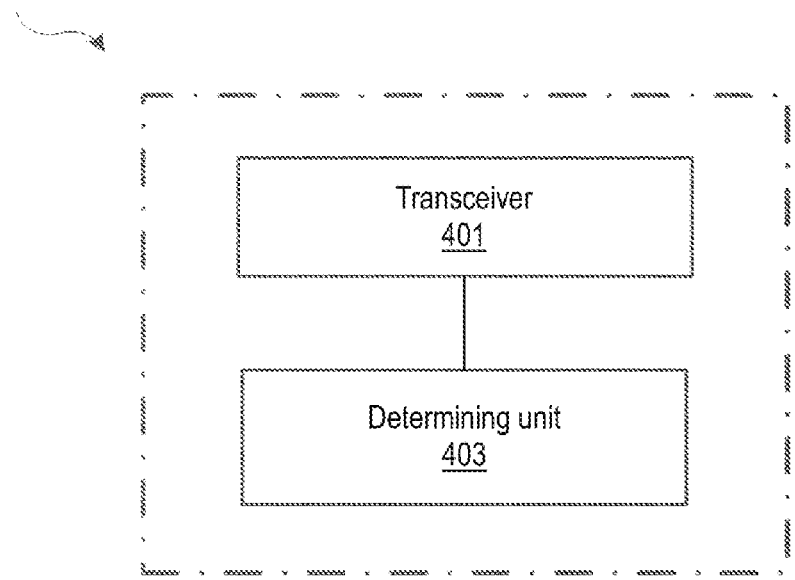
FIG. 4 is a schematic structural diagram of a UE according to an exemplary embodiment of the present invention.

FIG. 4 is a schematic structural diagram of a UE 400 according to an exemplary embodiment of the present invention.

As shown in FIG. 4, the UE 400 includes: a transceiver 401 and a determining unit 403. The UE 400 may use the transceiver 401 to configure for the UE configuration information of a non-anchor PRB for unicast data transmission, wherein the configuration information indicates a location of the non-anchor PRB configured by a base station for the UE; and use the determining unit 403 to determine the location of the non-anchor PRB in a frequency band based on the configuration information; and then use the transceiver 401 to perform unicast data transmission on the non-anchor PRB, so as to execute methods for determining a non-anchor physical resource block (PRB) according to various embodiments of the present invention, such as a method 600 shown in FIG. 6, a method 1100 shown in FIG. 11, and a method 1600 shown in FIG. 16 that will be described in details later.

Similarly, those skilled in the art should understand that only the transceiver 401 and the determining unit 403 related to the present invention are shown in the UE 400 of FIG. 4 to avoid confusion of the present invention. However, those skilled in the art should understand that although not shown in FIG. 4, the UE according to the embodiment of the present invention further includes other units that together form the UE.

As previously mentioned, according to whether frequency bands to which frequencies of an anchor PRB accessed by the UE 400 and a non-anchor PRB allocated by the base station 300 to the UE 300 belong are an LTE in-band frequency band, a guard band frequency band, or a frequency band of the stand-alone mode of operation (for example, the GSM frequency band), the following scenarios exist:

Scenario I: in-band to in-band; that is, the anchor PRB is a PRB in the anchor PRB set, and the non-anchor PRB may be a PRB represented in a manner of an LTE PRB or a PRB in the anchor PRB set;

Scenario II: guard band to in-band; that is, an offset value of the anchor PRB from the LTE central frequency is a certain element in the anchor PRB central frequency offset set; and the non-anchor PRB is a PRB represented in a manner of an LTE PRB or a PRB in the anchor PRB set;

Scenario III: in-band to guard band; that is, the anchor PRB is a PRB in the anchor PRB set, and the non-anchor PRB is in the guard band; in this situation, the non-anchor PRB may be any PRB in the guard band, a PRB in the guard band having an offset value of a central frequency from the LTE central frequency being a certain element in the anchor PRB central frequency offset set, or a PRB represented in a manner of being offset by a specific number of PRBs relative to a reference anchor PRB;

Scenario IV: guard band to guard band; that is, an offset value of the anchor PRB from the LTE central frequency is a certain element in the anchor PRB central frequency offset set, and the non-anchor PRB is in the guard band; in this situation, the non-anchor PRB may be any PRB in the guard band, a PRB in the guard band having an offset value of a central frequency from the LTE central frequency being a certain element in the anchor PRB central frequency offset set, or a PRB represented in a manner of being offset by a specific number of PRBs relative to a reference anchor PRB;

Scenario V: stand-alone to stand-alone; that is, the anchor PRB and the non-anchor PRB are both in a frequency band suitable for the stand-alone mode of operation.

The technical solutions of the present invention will be respectively described below according to whether a frequency band to which the non-anchor PRB configured by the base station 300 belongs is the LTE in-band frequency band, the guard band frequency band, or the frequency band of the stand-alone mode of operation.

First, with reference to FIG. 5, a flowchart of a method 500 for configuring a non-anchor PRB executed at a base station according to a first exemplary embodiment of the present invention is described. In the embodiment shown in FIG. 5, a frequency band to which the non-anchor PRB configured by the base station 300 belongs is the LTE in-band frequency band.

As shown in FIG. 5, the method 500 includes: step S501 and step S503.

In step S501, the configuration unit 303 of the base station 300 configures a non-anchor PRB for the UE 400 for unicast data transmission, wherein the non-anchor PRB is selected from a set of LTE in-band PRBs or a set of PRBs in the LTE in-band PRBs capable of being used as anchor PRBs, i.e., the previously defined anchor PRB set.

Specifically, the non-anchor PRB configured by the configuration unit 303 of the base station 300 for the UE 400 may be taken from one of the following sets:

Set of Set_I_A: PRBs included therein are LTE PRBs in-band excluding PRBs that have been used for sending information, such as an MIB, PSS/SSS, or SIB of NB-IoT; that is, non-anchor PRBs are LTE PRBs excluding those used as anchor PRBs;

Set of Set_I_B: PRBs included therein are PRBs in the anchor PRB set excluding PRBs that have been used for sending information, such as an MIB, PSS/SSS, or SIB of NB-IoT.

In fact, since PRBs satisfying the condition on which information such as an MIB, PSS/SSS, or SIB of NB-IoT is sent are determined by the base station 300 according to needs, it is impossible for the configuration unit 303 of the base station 300 to configure a PRB that has already been used as an anchor PRB as a non-anchor PRB.

In step S503, the transceiver 301 of the base station 300 sends to the UE 400 configuration information of the non-anchor PRB.

In the first embodiment, because the anchor PRB may be in-band (Scenario I) or in the guard band (Scenario II), the method 500 will be described below with reference to FIGS. 7-9 in combination with specific scenarios.

Scenario I: In-Band to in-Band: That is, the Anchor PRB and the Non-Anchor PRB are in-Band PRBs FIG. 7 is a schematic diagram illustrating the process that the configuration unit 303 of the base station 300 configures a non-anchor PRB for the UE 400 in Scenario I when a PCI of a cell where an anchor PRB locates is the same as a PCI of a corresponding LTE cell.

When a PCI of a cell where an anchor PRB locates is the same as a PCI of a corresponding LTE cell, the UE 400 would know an offset of the anchor PRB from the middle PRB of LTE.

At least the following implementations exist:

<Implementation 1>

Figure 7:
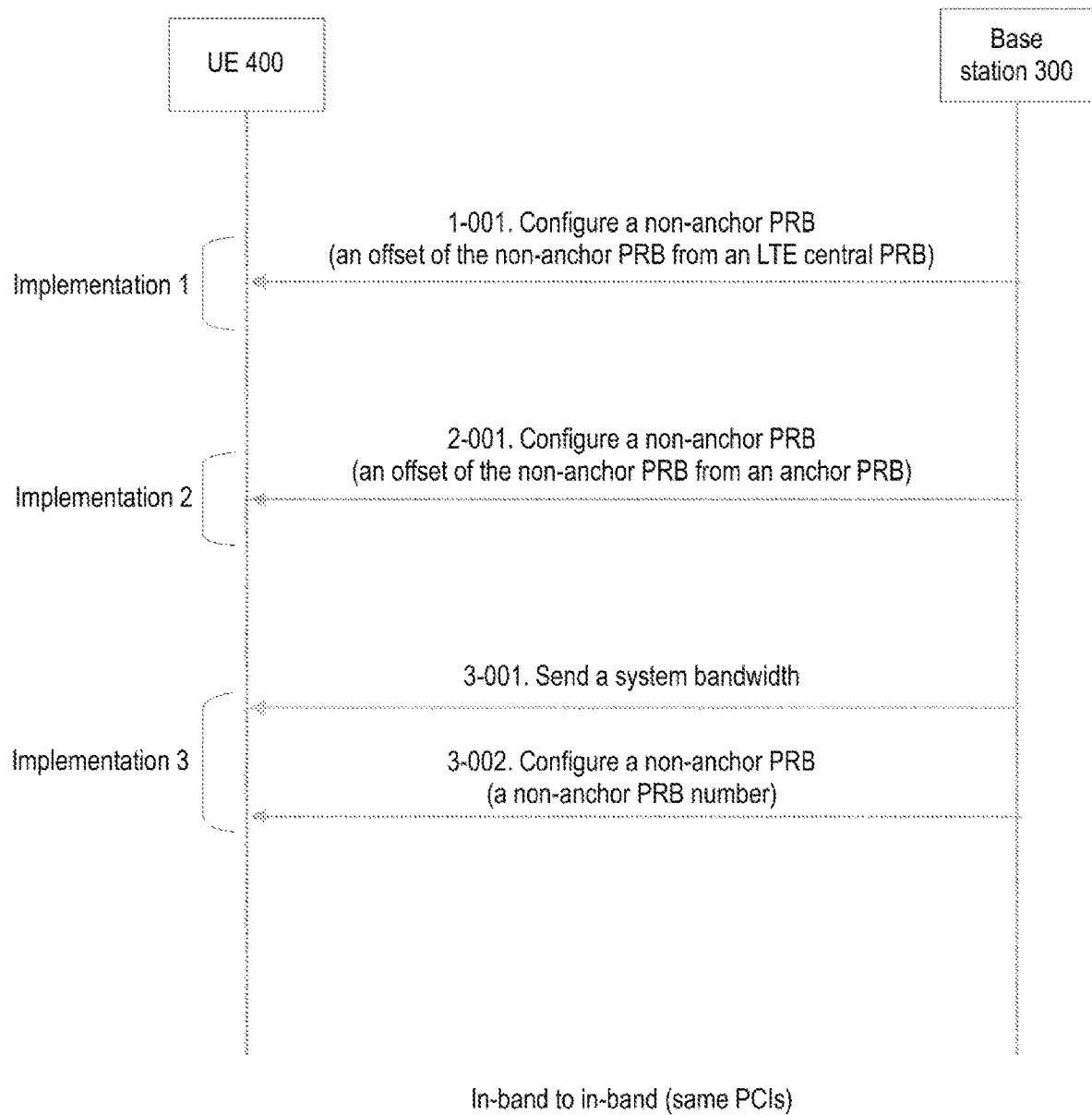
FIGS. 7-9 are respectively schematic diagrams illustrating signal flows between the base station and the UE in different scenarios when the method according to the first exemplary embodiment of the present invention is executed.

In this implementation, step S501 of the method 500 includes step 1-001 in FIG. 7: the configuration unit 303 of the base station 300 configures for the UE 400 an offset of the non-anchor PRB from the middle PRB of LTE, wherein the offset of the non-anchor PRB from the middle PRB of LTE may be configured through RRC signaling. The RRC signaling may be an RRC connection establishment message, an RRC connection reestablishment message, an RRC reconfiguration message, an RRC resume message, or the like; unless otherwise specified, the RRC signaling involved in other parts of the present invention may also be an RRC connection establishment message, an RRC connection reestablishment message, an RRC reconfiguration message, an RRC resume message, or the like;

Specifically, the offset of the non-anchor PRB from the middle PRB of LTE is configured as a first offset from the middle PRB of LTE or a second offset from the middle PRB of LTE according to whether the non-anchor PRB is taken from the set of Set_I_A or the set of Set_I_B.

Optionally, the configuration unit 303 of the base station 300 configures for the UE 400 an offset indication for the offset of the non-anchor PRB from the middle PRB of LTE, wherein the offset indication is used for indicating whether the non-anchor PRB, when compared with the middle PRB of LTE, is in a higher frequency band or lower frequency band;

optionally, the configuration unit 303 of the base station 300 configures for the UE 400 indication information for the offset of the non-anchor PRB from the middle PRB of LTE, wherein the indication information is used for indicating whether the configured non-anchor PRB has a first offset or second offset from the LTE central PRB. This configuration is suitable for the situation in which the system supports both the situations when the non-anchor PRB is taken from the set of Set_I_A or from the set of Set_I_B.

<Implementation 2>

In this implementation, step S501 of the method 500 includes step 1-002 in FIG. 7: the configuration unit 303 of the base station 300 configures for the UE 400 an offset of the non-anchor PRB from the anchor PRB.

Optionally, the configuration unit 303 of the base station 300 further configures for the UE 400 an offset indication for the offset of the non-anchor PRB from the anchor PRB, wherein the offset indication is used for indicating whether the non-anchor PRB, when compared with the anchor PRB, is in a higher frequency band or lower frequency band; and the offset and the offset indication may be sent through RRC signaling.

<Implementation 3>

In this implementation, the method 500 further includes a step of sending to the UE 400 system bandwidth indication information (not shown in FIG. 5 and shown as step 3-001 in FIG. 7). The system bandwidth indication information may be the actual system bandwidth, or the actual system bandwidth may be determined according to the system bandwidth indication information together with raster offset information broadcast by an eNB through an MIB. When the eNB broadcasts raster offset information through an MIB, the system bandwidth can only take a value corresponding to the raster offset. For example, when the raster offset is −2.5 kHz, the system bandwidth can only be 10 MHz or 20

MHz in the in-band mode of operation. At this point, the system bandwidth indication information is represented by 1 bit. Similarly, unless otherwise specified, the system bandwidth indication information mentioned in other embodiments of the present invention also adopts the manner described in this embodiment.

Step 3-001 in FIG. 7: the transceiver 301 of the base station 300 sends to the UE 400 system bandwidth indication information, wherein the system bandwidth indication information may be sent through a SIB or RRC signaling; and step S501 of the method 500 includes step 3-002 in FIG. 7: the configuration unit 303 of the base station 300 configures a non-anchor PRB number for the UE 400, wherein the non-anchor PRB number is an in-band LTE PRB number, and the non-anchor PRB number may be sent through RRC signaling.

Figure 8:
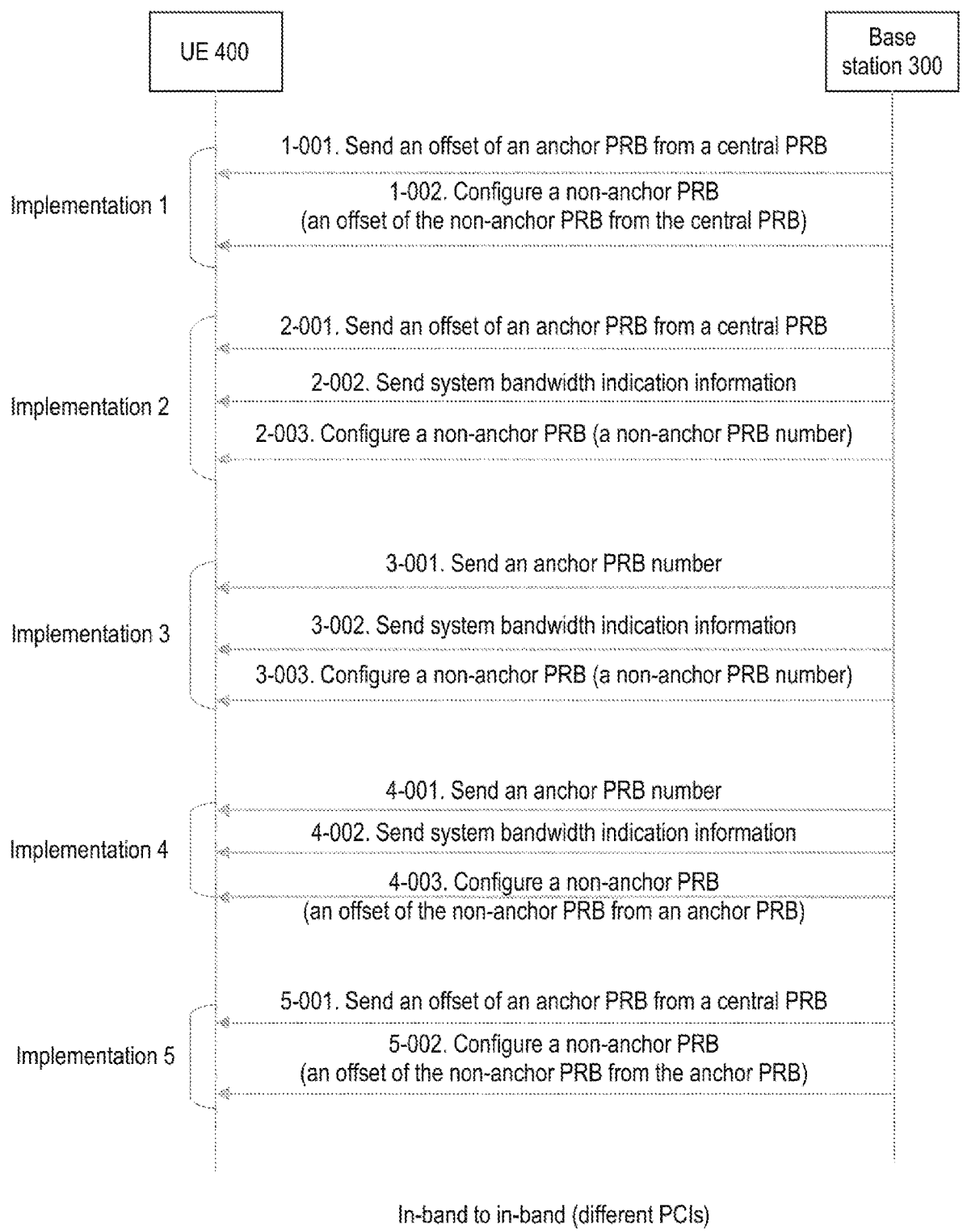

FIG. 8 is a schematic diagram illustrating the process that the configuration unit 303 of the base station 300 configures a non-anchor PRB for the UE 400 in Scenario I when a PCI of a cell where an anchor PRB locates is different from a PCI of a corresponding LTE cell.

When a PCI of a cell where an anchor PRB locates is different from a PCI of a corresponding LTE cell, the UE 400 would not know an offset of the anchor PRB from the middle PRB of LTE.

At least the following implementations exist:

<Implementation 1>

In this implementation, the method 500 further includes a step of sending to the UE 400 system bandwidth indication information (not shown in FIG. 5 and shown as step 1-001 in FIG. 8).

Step 1-001 in FIG. 8: the transceiver 301 of the base station 300 sends to the UE 400 an offset of the anchor PRB from the middle PRB of LTE, wherein the offset of the anchor PRB from the middle PRB of LTE may be sent through an MIB or SIB or configured through RRC signaling. Specifically, the transceiver 301 of the base station 300 sends to the UE 400 a second offset of the anchor PRB from the middle PRB of LTE; optionally, the transceiver 301 may also send to the UE 400 a first offset of the anchor PRB from the middle PRB of LTE; and step S501 of the method 500 includes step 1-002 in FIG. 8: the configuration unit 303 of the base station 300 configures for the UE 400 an offset of the non-anchor PRB from the middle PRB of LTE, wherein the offset may be sent through RRC signaling.

Specifically, the offset of the non-anchor PRB from the middle PRB of LTE is configured as a first offset from the middle PRB of LTE or a second offset from the middle PRB of LTE according to whether the non-anchor PRB is taken from the set of Set_I_A or the set of Set_I_B.

Optionally, the configuration unit 303 of the base station 300 configures for the UE 400 an offset indication for the offset of the non-anchor PRB from the middle PRB of LTE, wherein the offset indication is used for indicating whether the non-anchor PRB, when compared with the middle PRB of LTE, is in a higher frequency band or lower frequency band;

optionally, the configuration unit 303 of the base station 300 configures for the UE 400 indication information for the offset of the non-anchor PRB from the middle PRB of LTE, wherein the indication information is used for indicating whether the configured non-anchor PRB has a first offset or second offset from the middle PRB of LTE. This configuration is suitable for the situation in which the system supports both the situations when the non-anchor PRB is taken from the set of Set_I_A or from the set of Set_I_B.

<Implementation 2>

In this implementation, the method 500 further includes a step of sending to the UE 400 an offset of the anchor PRB from the middle PRB of LTE (not shown in FIG. 5 and shown as step 2-001 in FIG. 8) and a step of sending to the UE 400 system bandwidth indication information (not shown in FIG. 5 and shown as step 2-002 in FIG. 8).

Step 2-001 in FIG. 8: the transceiver 301 of the base station 300 sends to the UE 400 an offset of the anchor PRB from the middle PRB of LTE, wherein the offset may be a first offset or second offset from the LTE PRB center and may be sent through a SIB or RRC signaling;

Step 2-002 in FIG. 8: the transceiver 301 of the base station 300 sends to the UE 400 system bandwidth indication information, wherein the system bandwidth indication information may be sent through a SIB or RRC signaling; and step S501 of the method 500 includes step 2-003 in FIG. 8: the configuration unit 303 of the base station 300 configures a non-anchor PRB number for the UE 400, wherein the non-anchor PRB number is an in-band LTE PRB number that may be sent through RRC signaling.

Although sending of an offset of the anchor PRB from the middle PRB of LTE and sending of system bandwidth indication information are respectively shown using steps 2-001 and 2-002 in Implementation 2 of FIG. 8, it can be understood that these two steps have no particular order and can be combined into one sending step. The following similar descriptions have the same meaning.

<Implementation 3>

In this implementation, the method 500 further includes a step of sending to the UE 400 an anchor PRB number (not shown in FIG. 5 and shown as step 3-001 in FIG. 8) and a step of sending to the UE 400 system bandwidth indication information (not shown in FIG. 5 and shown as step 3-002 in FIG. 8).

Step 3-001 in FIG. 8: the transceiver 301 of the base station 300 sends to the UE 400 an anchor PRB number, wherein the anchor PRB number is an in-band LTE PRB number and may be sent through a SIB or RRC signaling;

Step 3-002 in FIG. 8: the transceiver 301 of the base station 300 sends to the UE 400 system bandwidth indication information, wherein the system bandwidth indication information may be sent through a SIB or RRC signaling; and step S501 of the method 500 includes step 3-003 in FIG. 8: the configuration unit 303 of the base station 300 configures a non-anchor PRB number for the UE 400, wherein the non-anchor PRB number is an in-band LTE PRB number that may be sent through RRC signaling.

<Implementation 4>

In this implementation, the method 500 further includes a step of sending to the UE 400 an anchor PRB number (not shown in FIG. 5 and shown as step 4-001 in FIG. 8).

Step 4-001 in FIG. 8: the transceiver 301 of the base station 300 sends to the UE 400 an anchor PRB number, wherein the anchor PRB number is an in-band LTE PRB number and may be sent through a SIB or RRC signaling;

step S501 of the method 500 includes step 4-002 in FIG. 8: the configuration unit 303 of the base station 300 configures for the UE 400 an offset of the non-anchor PRB from the anchor PRB. Specifically, the offset of the non-anchor PRB from the anchor PRB is configured as a first offset from the anchor PRB or a second offset from the anchor PRB according to whether the non-anchor PRB is taken from the set of Set_I_A or the set of Set_I_B.

Optionally, the configuration unit 303 of the base station 300 further configures for the UE 400 an offset indication for the offset of the non-anchor PRB from the anchor PRB, wherein the offset indication is used for indicating whether the non-anchor PRB, when compared with the anchor PRB, is in a higher frequency band or lower frequency band; and the offset and the offset indication may be sent through RRC signaling.

<Implementation 5>

In this implementation, the method 500 further includes a step of sending to the UE 400 system bandwidth indication information (not shown in FIG. 5 and shown as step 5-001 in FIG. 8).

Step 5-001 in FIG. 8: the transceiver 301 of the base station 300 sends to the UE 400 an offset of the anchor PRB from the middle PRB of LTE, wherein the offset of the anchor PRB from the middle PRB of LTE may be sent through an MIB or SIB or configured through RRC signaling. Specifically, the transceiver 301 of the base station 300 sends to the UE 400 a first offset of the anchor PRB from the middle PRB of LTE; optionally, the transceiver 301 may also send to the UE 400 a second offset of the anchor PRB from the middle PRB of LTE; and step S501 of the method 500 includes step 5-002 in FIG. 8: the configuration unit 303 of the base station 300 configures for the UE 400 an offset of the non-anchor PRB from the anchor PRB.

Optionally, the configuration unit 303 of the base station 300 configures for the UE 400 an offset indication for the offset of the non-anchor PRB from the anchor PRB, wherein the offset indication is used for indicating whether the non-anchor PRB, when compared with the anchor PRB, is in a higher frequency band or lower frequency band.

Scenario II: Guard Band to in-Band: That is, the Anchor PRB is in the Guard Band, while the Non-Anchor PRB is an in-Band PRB FIG. 9 is a schematic diagram illustrating the process that the configuration unit 303 of the base station 300 configures a non-anchor PRB for the UE 400 in Scenario II.

Figure 9:
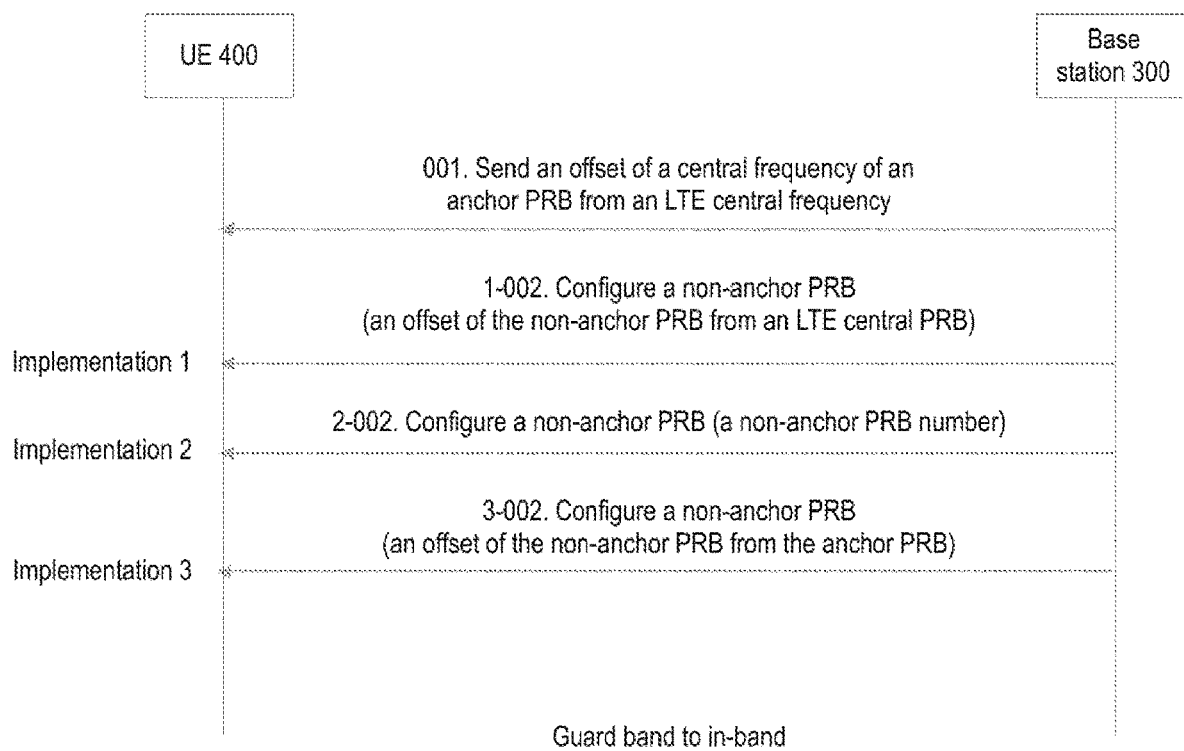

In Scenario II, the method 500 further includes a step of sending to the UE 400 an offset of a central frequency of the anchor PRB from an LTE central frequency (not shown in FIG. 5 and shown as step 001 in FIG. 9).

Step 001 in FIG. 9: the transceiver 301 of the base station 300 sends to the UE 400 an offset of a central frequency of the anchor PRB from an LTE central frequency, wherein the offset of the central frequency of the anchor PRB from the LTE central frequency may be sent through an MIB or SIB, or configured through RRC signaling.

Specifically, the sending an offset of a central frequency of the anchor PRB from an LTE central frequency may be represented by the following representations:

Representation 1: elements in the anchor PRB central frequency offset sets at system bandwidths of 3/5/10/15/20 MHz shown in Table 2 are uniformly numbered in a predefined order, wherein the numbers are offsets from the LTE central frequency. Table 9 shows a possible numbering manner, and the configuration unit 300 of the base station 300 may configure an offset of a central frequency of the anchor PRB from an LTE central frequency according to the numbers.

TABLE 9

| First offset from LTE central frequency | Offset value from LTE central frequency | First offset from LTE central frequency | Offset value from LTE central frequency |
|---|---|---|---|
| 0 | −9907.5 | 20 | 9907.5 |
| 1 | −9802.5 | 21 | 9802.5 |
| 2 | −9697.5 | 22 | 9697.5 |
| 3 | −9607.5 | 23 | 9607.5 |
| 4 | −9502.5 | 24 | 9502.5 |
| 5 | −9397.5 | 25 | 9397.5 |
| 6 | −9307.5 | 26 | 9307.5 |
| 7 | −9202.5 | 27 | 9202.5 |
| 8 | −9097.5 | 28 | 9097.5 |
| 9 | −7402.5 | 29 | 7402.5 |
| 10 | −7297.5 | 30 | 7297.5 |
| 11 | −7207.5 | 31 | 7207.5 |
| 12 | −7102.5 | 32 | 7102.5 |
| 13 | −6997.5 | 33 | 6997.5 |
| 14 | −6892.5 | 34 | 6892.5 |
| 15 | −4897.5 | 35 | 4897.5 |
| 16 | −4807.5 | 36 | 4807.5 |
| 17 | −4702.5 | 37 | 4702.5 |
| 18 | −4597.5 | 38 | 4597.5 |
| 19 | −2392.5 | 39 | 2392.5 |

Representation 2: half of elements (for example, all elements whose offset values are positive) in the anchor PRB central frequency offset sets at system bandwidths of 3/5/10/15/20 MHz shown in Table 2 are uniformly numbered in a predefined order; the numbers are offsets from the LTE central frequency. When this representation is used, the eNB further needs to send an offset indication for the central frequency of the anchor PRB and the LTE central frequency, wherein the offset indication is used for indicating whether the central frequency of the anchor PRB is in a higher frequency or lower frequency within the LTE central frequency. The offset indication may be sent in an MIB, SIB, or RRC signaling. Or representation 3: an anchor PRB central frequency set at a specific bandwidth is numbered in a predefined order, wherein the numbers are offsets from the LTE central frequency. When this representation is used, the eNB further needs to send system bandwidth indication information; the system bandwidth indication information may be sent in an MIB, SIB, or RRC signaling.

Representation 4: half of elements (for example, all elements whose offset values are positive) in an anchor PRB central frequency set at a specific bandwidth are numbered in a predefined order; the numbers are offsets from the LTE central frequency. When this representation is used, the eNB further needs to send system bandwidth indication information and an offset indication for the central frequency of the anchor PRB and the LTE central frequency. The system bandwidth indication information may be sent in an MIB, SIB, or RRC signaling; and the offset indication is used for indicating whether the central frequency of the anchor PRB is in a higher frequency or lower frequency within the LTE central frequency. The offset indication may be sent in an MIB, SIB, or RRC signaling.

Representation 5: a corresponding anchor PRB central frequency offset set is determined according to raster offset information broadcast by the eNB in an MIB, and elements in the anchor PRB central frequency offset set are sequentially numbered in a predefined order; the numbers are offsets from the LTE central frequency.

For example, a set {+4597.5, −4702.5, +4897.5, +6997.5, −7102.5, +7297.5, −7402.5, +9097.5, −9202.5, +9397.5, −9502.5, +9697.5, −9802.5} consisting of elements in the corresponding row with the corresponding raster offset of −2.5 kHz shown in Table 10 is numbered in a predefined manner (for example, one numbering manner is shown in Table 11), and the numbers are offsets from the LTE central frequency. Similarly, numbering is performed in the same manner when raster offsets are +2.5 kHz and +/−7.5 kHz, and the numbers are offsets from the LTE central frequency.

TABLE 10

| Raster offset | 5 MHz (kHz) | 10 MHz (kHz) | 15 MHz (kHz) | 20 MHz (kHz) |
|---|---|---|---|---|
| −2.5 kHz | | +4597.5/−4702.5/+4897.5 | +6997.5/−7102.5/+7297.5/−7402.5 | +9097.5/−9202.5/+9397.5/−9502.5/+9697.5/−9802.5 |
| +2.5 kHz | | −4597.5/+4702.5/−4897.5 | −6997.5/+7102.5/−7297.5/+7402.5 | −9097.5/+9202.5/−9397.5/+9502.5/−9697.5/+9802.5 |
| −7.5 kHz | +2392.5 | −4807.5 | +6892.5/−7207.5 | −9307.5/−9607.5/−9907.5 |
| +7.5 kHz | −2392.5 | +4807.5 | −6892.5/+7207.5 | +9307.5/+9607.5/+9907.5 |

TABLE 11

| Offset from LTE central frequency | Offset value (−2.5 kHz) from LTE central frequency |
|---|---|
| 0 | −9802.5 |
| 1 | −9502.5 |
| 2 | −9202.5 |
| 3 | −7402.5 |
| 4 | −7102.5 |
| 5 | −4702.5 |
| 6 | +4597.5 |
| 7 | +4897.5 |
| 8 | +6997.5 |
| 9 | +7297.5 |
| 10 | +9097.5 |
| 11 | +9397.5 |
| 12 | +9697.5 |

It should be noted that the aforementioned five representations of an offset from a central frequency of an anchor PRB from an LTE central frequency are also applicable to other embodiments.

Step S501 of the method 500 has at least the following implementations:

<Implementation 1>

In this implementation, step S501 of the method 500 includes step 1-002 in FIG. 9: the configuration unit 303 of the base station 300 configures for the UE 400 an offset of the non-anchor PRB from the middle PRB of LTE, wherein the offset may be sent through RRC signaling, which is similar to step 1-002 in Implementation 1 of FIG. 8 and will not be described herein again.

<Implementation 2>

In this implementation, step S501 of the method 500 includes step 2-002 in FIG. 9: the configuration unit 303 of the base station 300 configures a non-anchor PRB number for the UE 400; the non-anchor PRB number is an in-band LTE PRB number and may be sent through RRC signaling, which is similar to step 2-003 in Implementation 2 of FIG. 8 and will not be described herein again.

<Implementation 3>

In this implementation, step S501 of the method 500 includes step 3-002 in FIG. 9: the configuration unit 303 of the base station 300 configures for the UE 400 an offset of the non-anchor PRB from the anchor PRB, which is similar to step 5-002 in Implementation 5 of FIG. 8 and will not be described herein again.

Correspondingly, a flowchart of a method 600 for determining a location of a non-anchor PRB executed at a UE according to the first exemplary embodiment of the present invention is described below with reference to FIG. 6.

In step S601, the transceiver 401 of the UE 400 receives, from the base station 300, configuration information of a non-anchor PRB configured for the UE for unicast data transmission;

in step S603, the determining unit 403 of the UE 400 determines, based on the configuration information, a location of the non-anchor PRB in a set of LTE in-band PRBs or a set of PRBs in the LTE in-band PRBs capable of being used as anchor PRBs; and in step S605, the transceiver 401 of the UE 400 performs unicast data transmission on the non-anchor PRB.

Next, with reference to FIG. 10, a flowchart of a method 1000 for configuring a non-anchor PRB executed at a base station according to a second exemplary embodiment of the present invention is described. In the embodiment shown in FIG. 10, a frequency band to which the non-anchor PRB configured by the base station 1000 belongs is a frequency band in a guard band.

As shown in FIG. 10, the method 1000 includes: step S1001 and step S1003.

In step S1001, the configuration unit 303 of the base station 300 configures a non-anchor PRB for the UE 400 for unicast data transmission, wherein the non-anchor PRB is selected from a set of guard band PRBs of LTE. The guard band PRBs are those represented in a manner of dividing a guard band according to offsets of central frequencies thereof relative to an LTE central frequency sequentially in ascending order, or PRBs in the guard band represented in a manner of being offset by specific numbers of PRBs relative to a reference anchor PRB, or PRBs in the guard band capable of being used as anchor PRBs.

Specifically, the non-anchor PRB configured by the configuration unit 303 of the base station 300 for the UE 400 may be taken from one of the following sets:

Set of Set_II_A: PRBs included therein are guard band PRBs in the guard band excluding PRBs that have been used for sending information, such as an MIB, PSS/SSS, or SIB of NB-IoT;

Set of Set_II_B: PRBs included therein are PRBs in a reference anchor PRB set excluding PRBs that have been used for sending information, such as an MIB, PSS/SSS, or SIB of NB-IoT; and a reference anchor PRB corresponding to the reference anchor PRB set may be the current anchor PRB.

In step S1003, the transceiver 301 of the base station 300 sends to the UE 400 configuration information of the non-anchor PRB.

In the second embodiment, because the anchor PRB may be in-band (Scenario III) or in the guard band (Scenario IV), the method 1000 will be described below with reference to FIGS. 12-14 in combination with specific scenarios.

Scenario III: In-Band to Guard Band: That is, the Anchor PRB is an in-Band PRB, while the Non-Anchor PRB is in the Guard Band FIG. 12 is a schematic diagram illustrating the process that the configuration unit 303 of the base station 300 configures a non-anchor PRB for the UE 400 in Scenario II: when a PCI of a cell where an anchor PRB locates is the same as a PCI of a corresponding LTE cell.

At least the following implementations exist:

<Implementation 1>

Figure 12:
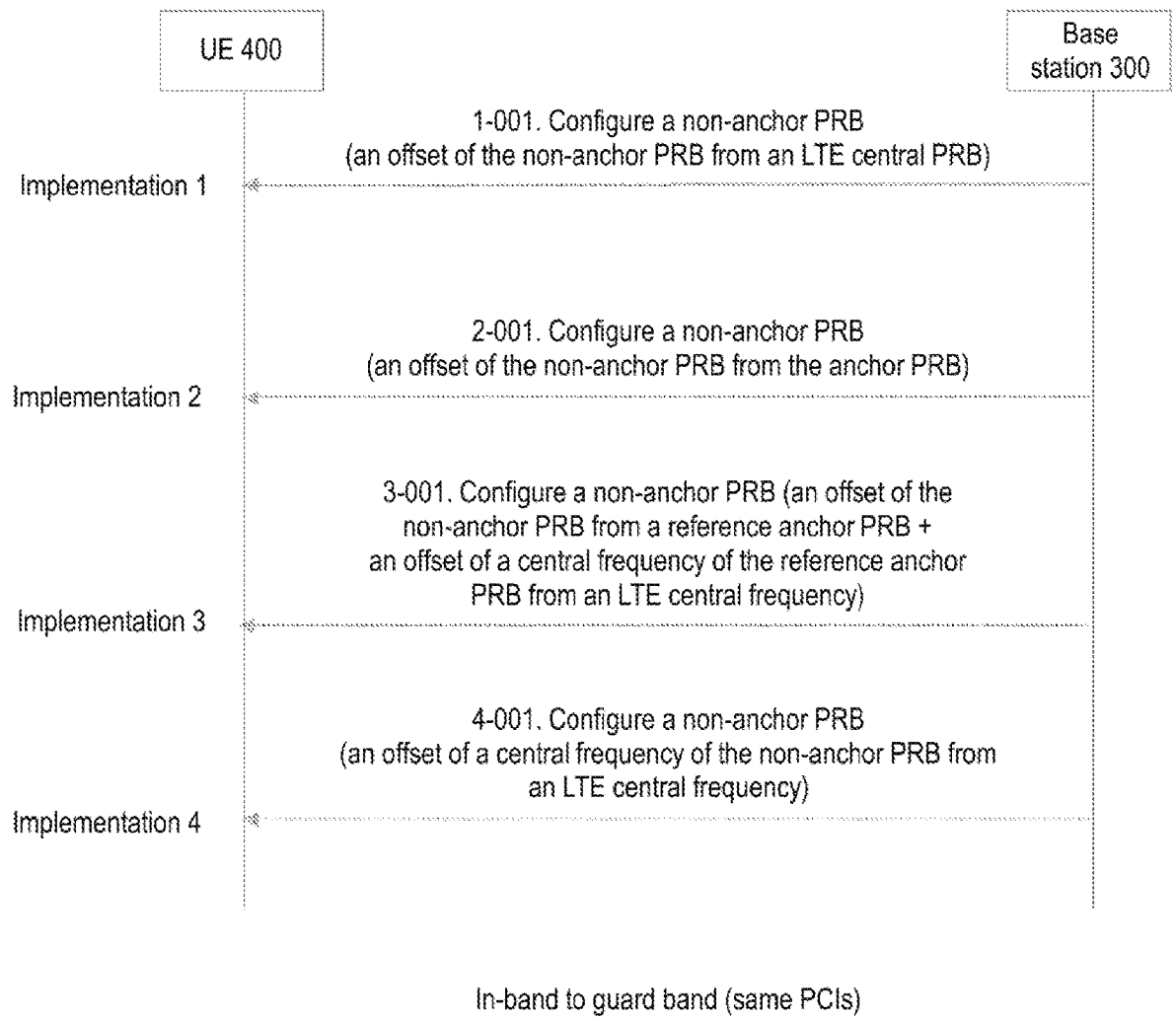
FIGS. 12-14 are respectively schematic diagrams illustrating signal flows between the base station and the UE in different scenarios when the method according to the second exemplary embodiment of the present invention is executed.

In this implementation, step S1001 of the method 1000 includes step 1-001 in FIG. 12: the configuration unit 303 of the base station 300 configures for the UE 400 an offset of the non-anchor PRB from the middle PRB of LTE, wherein the offset of the non-anchor PRB from the middle PRB of LTE may be configured through RRC signaling. The RRC signaling may be an RRC connection establishment message, an RRC connection reestablishment message, an RRC reconfiguration message, an RRC resume message, or the like; unless otherwise specified, the RRC signaling involved in other parts of the present invention may also be an RRC connection establishment message, an RRC connection reestablishment message, an RRC reconfiguration message, an RRC resume message, or the like.

<Implementation 2>

In this implementation, step S1001 of the method 1000 includes step 2-001 in FIG. 12: the configuration unit 303 of the base station 300 configures for the UE 400 an offset of the non-anchor PRB from the anchor PRB. Optionally, the configuration unit 303 of the base station 300 further configures for the UE 400 an offset indication for the offset of the non-anchor PRB from the anchor PRB, wherein the offset indication is used for indicating whether the non-anchor PRB, when compared with the anchor PRB, is in a higher frequency band or lower frequency band; and the offset and the offset indication may be sent through RRC signaling.

<Implementation 3>

In this implementation, step S1001 of the method 1000 includes step 3-001 in FIG. 12: the configuration unit 303 of the base station 300 configures for the UE 400 an offset of the non-anchor PRB from the reference anchor PRB and an offset of a central frequency of the reference anchor PRB from the LTE central frequency.

Optionally, the configuration unit 303 of the base station 300 further configures for the UE 400 an offset indication for the offset of the non-anchor PRB from the reference anchor PRB, wherein the offset indication is used for indicating whether the non-anchor PRB, when compared with the reference anchor PRB, is in a higher frequency band or lower frequency band; and the offset and the offset indication may be sent through RRC signaling.

Optionally, the configuration unit 303 of the base station 300 further configures for the UE 400 an offset indication for a central frequency of the reference anchor PRB and the LTE central frequency; the offset indication is used for indicating whether the central frequency of the reference anchor PRB, when compared with the LTE central frequency, is in a higher frequency or lower frequency; and the offset and the offset indication may be sent through RRC signaling.

<Implementation 4>

In this implementation, step S1001 of the method 1000 includes step 4-001 in FIG. 12: the configuration unit 303 of the base station 300 configures for the UE 400 an offset of a central frequency of the non-anchor PRB from the LTE central frequency.

In the aforementioned implementations, specifically, a first offset or third offset of the non-anchor PRB from the middle PRB of LTE or a first offset from the reference anchor PRB is configured according to whether the non-anchor PRB is taken from the set of Set_II_A or the set of Set_II_B.

Optionally, the configuration unit 303 of the base station 300 further configures for the UE 400 an offset indication for the first offset or third offset of the non-anchor PRB from the middle PRB of LTE or the first offset from the reference anchor PRB; the offset indication is used for indicating whether the non-anchor PRB, when compared with the central frequency of the middle PRB of LTE or the central frequency of the reference anchor PRB, is in a higher frequency band or lower frequency band.

Optionally, the configuration unit 303 of the base station 300 further configures for the UE 400 indication information for the first offset or third offset of the non-anchor PRB from the middle PRB of LTE or the first offset from the reference anchor PRB; the indication information is used for indicating whether the configured non-anchor PRB has the first offset or third offset from the middle PRB of LTE or has the first offset from the reference anchor PRB. This configuration is suitable for the situation in which the system supports both the situations when the non-anchor PRB is taken from the set of Set_II_A or from the set of Set_II_B.

Optionally, a reference anchor PRB indication configured by the configuration unit 303 of the base station 300 for the UE 400 is used for indicating which one in the anchor PRB central frequency offset set is the offset of the central frequency of the reference anchor PRB from the LTE central frequency.

Figure 13:
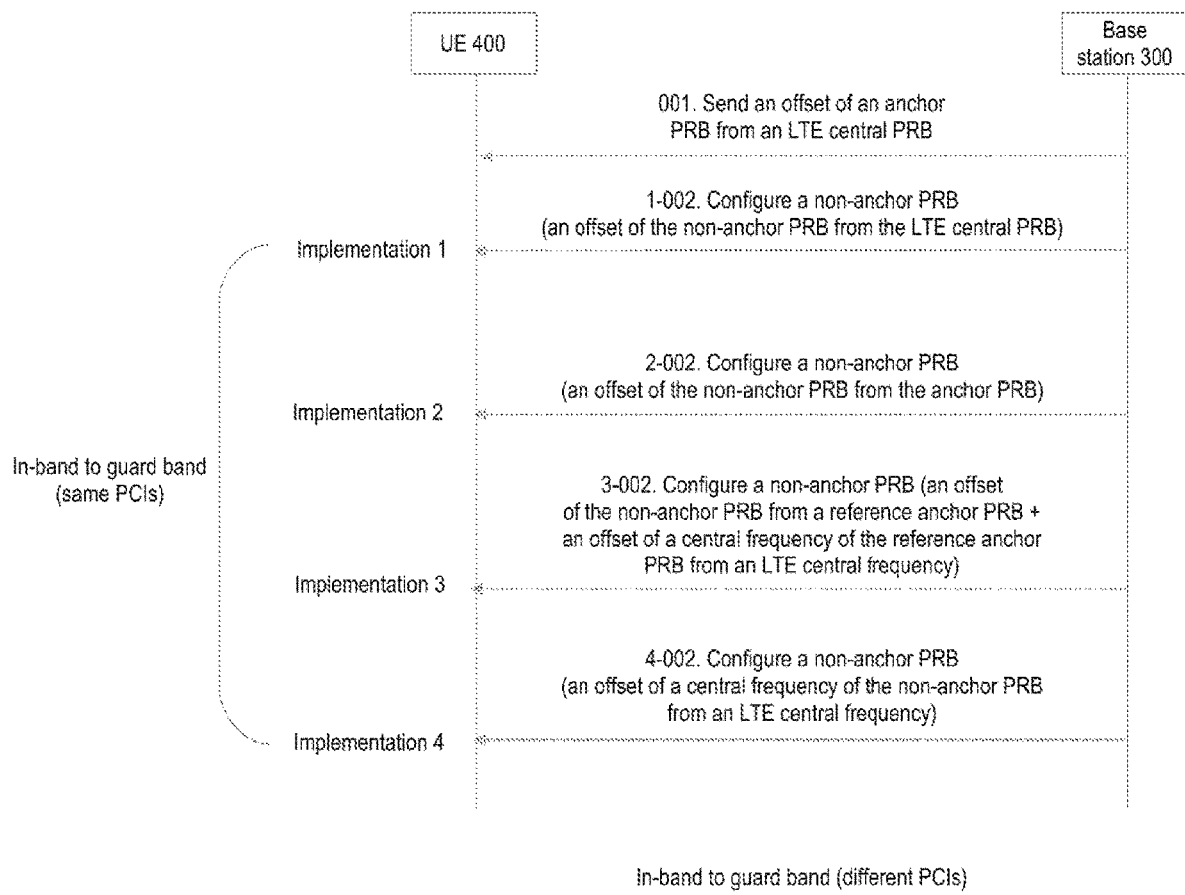

FIG. 13 is a schematic diagram illustrating the process that the configuration unit 303 of the base station 300 configures a non-anchor PRB for the UE 400 in Scenario III when a PCI of a cell where an anchor PRB locates is different from a PCI of a corresponding LTE cell.

As shown in FIG. 13, the difference between FIG. 13 and FIG. 12 merely lies in that the method 1000 further includes a step that the transceiver 301 of the base station 300 sends to the UE 400 an offset of the anchor PRB from the middle PRB of LTE (not shown in FIG. 10 and shown as step 001 in FIG. 13).

Step S1001 of the method 1000 includes at least the aforementioned implementations described with reference to FIG. 12, which will not be described herein again.

Scenario IV: Guard Band to Guard Band: That is, the Anchor PRB and the Non-Anchor PRB are Both in the Guard Band FIG. 14 is a schematic diagram illustrating the process that the configuration unit 303 of the base station 300 configures a non-anchor PRB for the UE 400 in Scenario IV.

Figure 14:
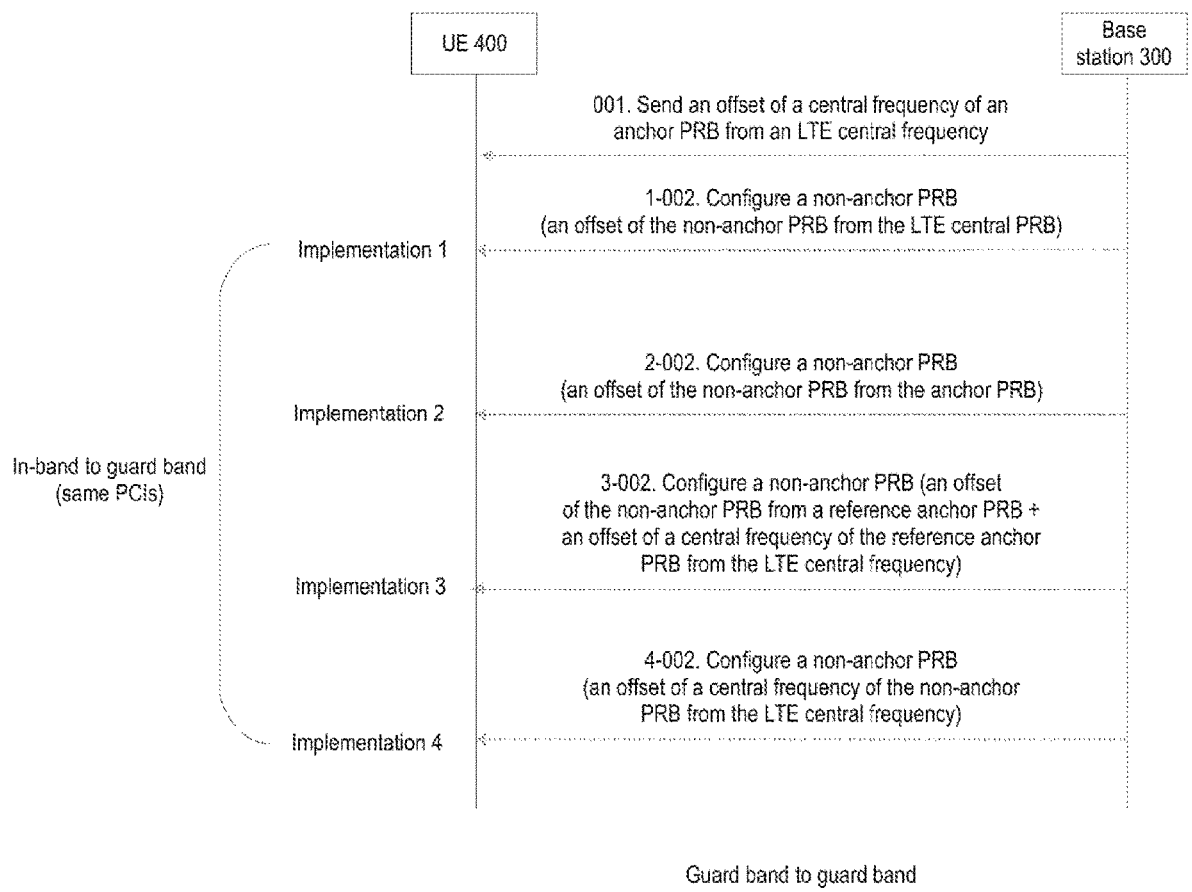

As shown in FIG. 14, the difference between FIG. 14 and FIG. 12 merely lies in that the method 1000 further includes a step that the transceiver 301 of the base station 300 sends to the UE 400 an offset of a central frequency of the anchor PRB from the LTE central frequency (not shown in FIG. 10 and shown as step 001 in FIG. 14), which is similar to step 001 in FIG. 9 and will not be described herein again.

Step S1001 of the method 1000 includes at least the aforementioned implementations described with reference to FIG. 12, which will not be described herein again.

Correspondingly, a flowchart of a method 1100 for determining a location of a non-anchor PRB executed at a UE according to the second exemplary embodiment of the present invention is described below with reference to FIG. 11.

In step S1101, the transceiver 401 of the UE 400 receives, from the base station 300, configuration information of a non-anchor PRB configured for the UE for unicast data transmission;

in step S1103, the determining unit 403 of the UE 400 determines, based on the configuration information, a location of the non-anchor PRB in a set of Long Term Evolution (LTE) guard band PRBs; and in step S1105, the transceiver 401 of the UE 400 performs unicast data transmission on the non-anchor PRB.

Next, with reference to FIG. 15, a flowchart of a method 1500 for configuring a non-anchor PRB executed at a base station according to a third exemplary embodiment of the present invention is described. In the embodiment shown in FIG. 15, an anchor PRB accessed by the UE 400 and a non-anchor PRB configured by the base station 300 are in a frequency band of a stand-alone mode of operation (for example, a GSM frequency band).

As shown in FIG. 15, the method 1500 includes: step S1501 and step S1503.

In step S1501, the configuration unit 303 of the base station 300 configures a non-anchor PRB for the UE 400 for unicast data transmission, wherein the non-anchor PRB is selected from a set of PRBs in a frequency band suitable for the stand-alone mode of operation; and the PRBs in the frequency band suitable for the stand-alone mode of operation are PRBs represented in a manner of dividing subcarriers according to frequencies in ascending order in the frequency band suitable for the stand-alone mode of operation, or PRBs represented in a manner of being offset by specific numbers of PRBs relative to a reference anchor PRB in the frequency band suitable for the stand-alone mode of operation.

Specifically, the non-anchor PRB configured by the configuration unit 303 of the base station 300 for the UE 400 may be taken from one of the following sets:

Set of Set_II_A: PRBs included therein are PRBs in, for example, the GSM frequency band, excluding PRBs that have been used for sending information, such as an MIB, PSS/SSS, or SIB of NB-IoT (namely, non-anchor PRBs are GSM PRBs excluding those used as anchor PRBs); the GSM PRBs are PRBs obtained by dividing a GSM subcarrier according to frequencies in ascending order.

Set of Set_III_B: PRBs included therein are PRBs in a reference anchor PRB set excluding PRBs that have been used for sending information, such as an MIB, PSS/SSS, or SIB of NB-IoT; and a reference anchor PRB corresponding to the reference anchor PRB set may be the current anchor PRB.

In step S1503, the transceiver 301 of the base station 300 sends to the UE 400 configuration information of the non-anchor PRB.

In the third embodiment, an anchor PRB accessed by the UE 400 and a non-anchor PRB configured by the base station 300 are both in a frequency band of a stand-alone mode of operation (for example, a GSM frequency band) (Scenario IV); and the method 1500 will be described below with reference to FIG. 17.

At least the following implementations exist:

<Implementation 1>

Figure 17:
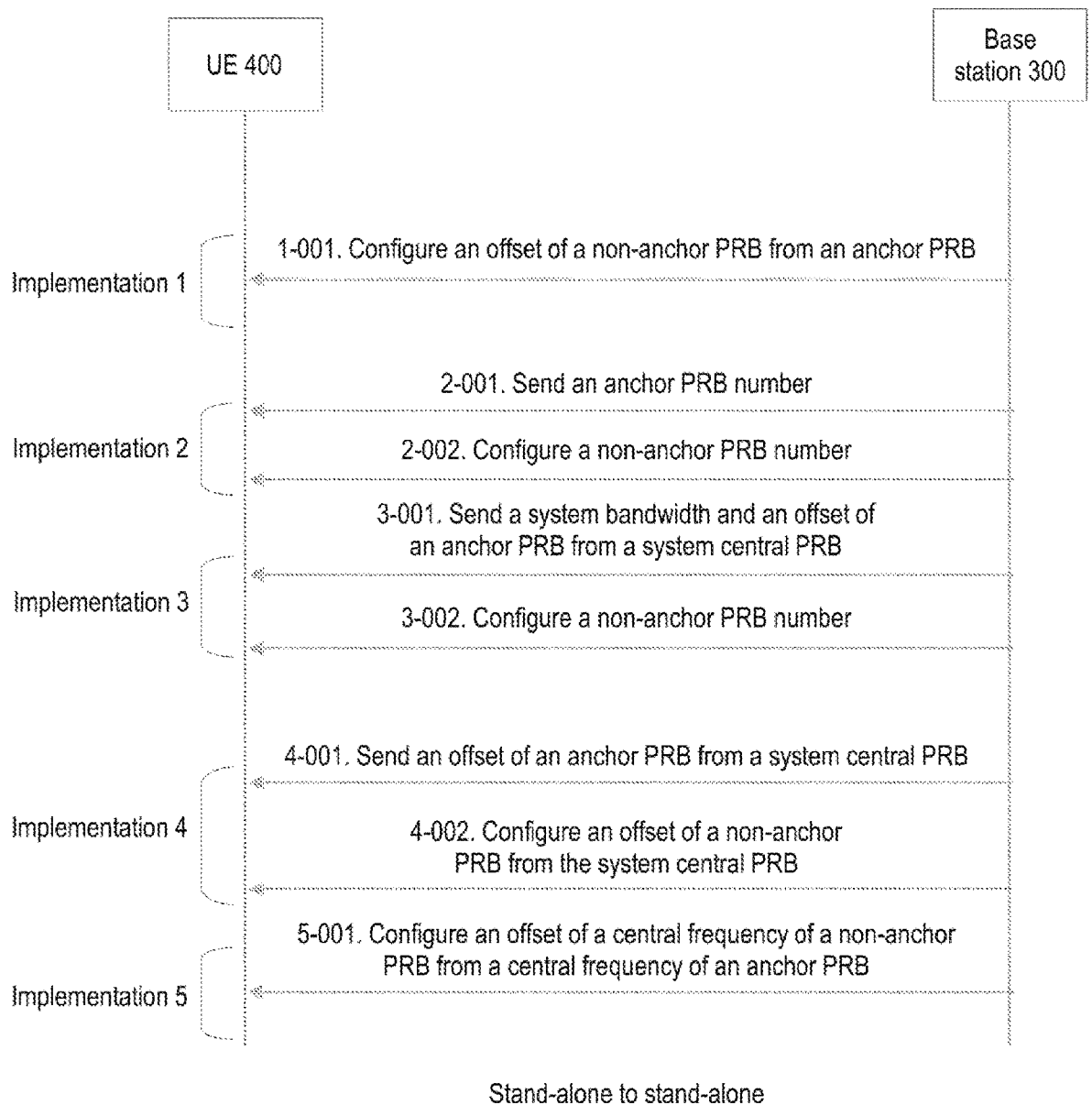
FIG. 17 is a schematic diagram illustrating signal flows between the base station and the UE when the method according to the third exemplary embodiment of the present invention is executed.

In this implementation, step S1501 of the method 1500 includes step 1-001 in FIG. 17: the configuration unit 303 of the base station 300 configures for the UE 400 an offset of the non-anchor PRB from the anchor PRB and an offset indication. The offset is the number of PRBs by which the anchor PRB and the non-anchor PRB are spaced apart; the offset is sent through RRC signaling, and the offset indication is used for indicating whether the non-anchor PRB, when compared with the anchor PRB, is in a higher frequency band or lower frequency band.

<Implementation 2>

In this implementation, the method 1500 further includes a step of sending to the UE 400 an anchor PRB number (not shown in FIG. 15 and shown as step 2-001 in FIG. 17);

step 2-001 in FIG. 17: the transceiver 301 of the base station 300 sends an anchor PRB number to the UE 400, where the anchor PRB number is obtained by dividing a subcarrier in the system bandwidth according to frequencies in ascending order into PRBs and sequentially numbering them; and the anchor PRB number may be sent through an MIB or SIB or RRC signaling;

step S1501 of the method 1500 includes step 2-002 in FIG. 17: the configuration unit 303 of the base station 300 configures a non-anchor PRB number for the UE 400; the non-anchor PRB is a PRB obtained by dividing the system bandwidth according to the method in step 2-001, and the non-anchor PRB number is sent through RRC signaling.

<Implementation 3>

In this implementation, the method 1500 further includes a step of sending to the UE 400 an anchor PRB number (not shown in FIG. 15 and shown as step 3-001 in FIG. 17);

step 3-001 in FIG. 17: the transceiver 301 of the base station 300 sends to the UE 400 system bandwidth indication information, an offset of the anchor PRB from a system central PRB, and an offset indication; the offset indication is used for indicating whether the anchor PRB is in a higher frequency band or lower frequency band than that of the system central PRB;

step S1501 of the method 1500 includes step 3-002 in FIG. 17: the configuration unit 303 of the base station 300 configures a non-anchor PRB number for the UE 400; the non-anchor PRB number may be sent through RRC signaling.

<Implementation 4>

In this implementation, the method 1500 further includes a step of sending to the UE 400 an anchor PRB number (not shown in FIG. 15 and shown as step 4-001 in FIG. 17);

step 4-001 in FIG. 17: the transceiver 301 of the base station 300 sends to the UE 400 an offset of the anchor PRB from a stand-alone mode of operation system bandwidth central PRB, and an offset indication, wherein the offset indication is used for indicating whether the anchor PRB, when compared with the stand-alone mode of operation system bandwidth central PRB, is in a higher frequency band or lower frequency band;

step S1501 of the method 1500 includes step 4-002 in FIG. 17: configuring an offset of the non-anchor PRB from the stand-alone mode of operation system bandwidth central PRB and an offset indication; the offset indication is used for indicating whether the non-anchor PRB, when compared with the stand-alone mode of operation system bandwidth central PRB, is in a higher frequency band or lower frequency band; and the offset and the offset indication may be sent through RRC signaling.

<Implementation 5>

In this implementation, step S501 of the method 1500 includes step 5-001 in FIG. 17: the configuration unit 303 of the base station 300 configures for the UE 400 an offset of a central frequency of the non-anchor PRB from a central frequency of the anchor PRB and an offset indication; the offset indication is used for indicating whether the central frequency of the non-anchor PRB, when compared with the central frequency of the anchor PRB, is a higher frequency or lower frequency.

Figure 16:
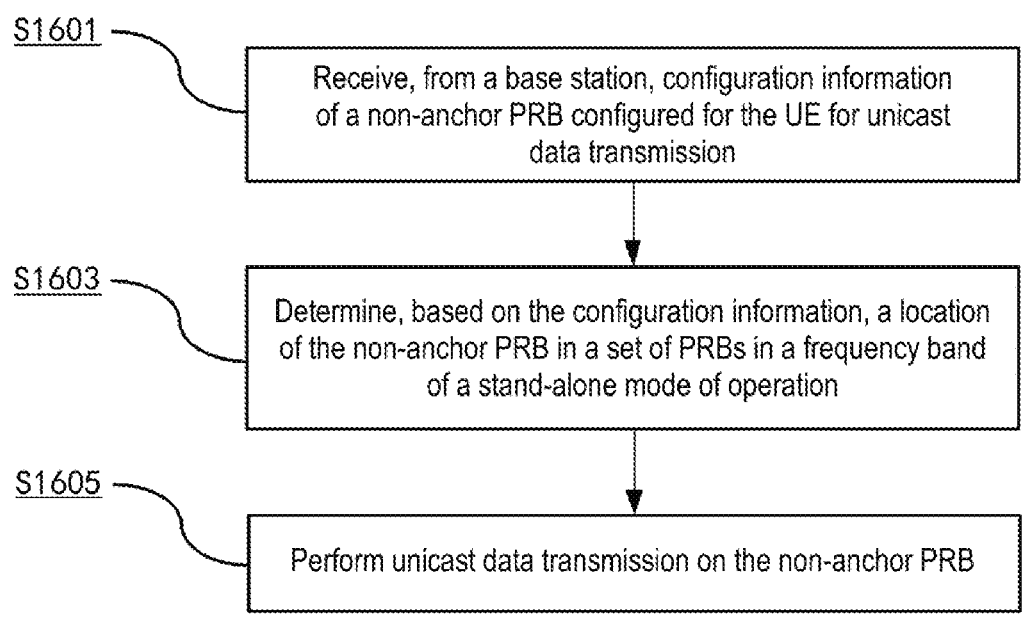
FIG. 16 is a flowchart of a method executed at a UE according to the third exemplary embodiment of the present invention.

Correspondingly, a flowchart of a method 1600 for determining a location of a non-anchor PRB executed at a UE according to the third exemplary embodiment of the present invention is described below with reference to FIG. 16.

In step S1601, the transceiver 401 of the UE 400 receives, from the base station 300, configuration information of a non-anchor PRB configured for the UE for unicast data transmission;

in step S1603, the determining unit 403 of the UE 400 determines, based on the configuration information, a location of the non-anchor PRB in a set of PRBs in a frequency band suitable for a stand-alone mode of operation; and in step S1605, the transceiver 401 of the UE 400 performs unicast data transmission on the non-anchor PRB.

In the guard band to in-band combination mode, when a PCI of a cell where an anchor PRB locates is the same as a PCI of an LTE cell, the base station may configure for the UE indication information indicating that the PCI of the cell where the anchor PRB locates is the same as the PCI of the LTE cell, so that the UE can perform a non-anchor PRB channel estimation according to an LTE CRS; the indication information is used for indicating whether the PCI of the cell where the anchor PRB locates is the same as the PCI of the LTE cell.

After the UE executes a random access, the mode of operation thereof has already been determined. At this point, if the non-anchor PRB configured by the base station for the UE can only be an in-band PRB or a PRB in the guard band (for example, determined in a predefined manner), the non-anchor PRB may be configured for the UE according to the methods defined in Scenarios I to IV; but if the base station can dynamically select between whether the non-anchor PRB configured for the UE is an in-band PRB or a PRB in the guard band, two methods exist for configuring the non-anchor PRB for the UE:

Configuration Method 1: the base station sends to the UE an indication information for a non-anchor PRB type, wherein the indication information is used for indicating whether the non-anchor PRB is in in-band or in a guard band; and then the base station selects one configuration method from Scenarios I to IV according to the indication information and a current mode of operation of the UE to configure the non-anchor PRB for the UE;

Configuration Method 2: when the UE is in an in-band mode of operation or guard-band mode of operation, if it is not defined whether the configurable non-anchor PRB is in in-band or in the guard band, i.e., the non-anchor PRB configured for the UE in the two modes of operation may be an LTE PRB or a PRB in the guard band, the base station may configure the non-anchor PRB in the following manners, depending on different manners of dividing the guard band:

(1) if the non-anchor PRB is taken from LTE PRBs or guard band PRBs, the non-anchor PRB may be configured according to the following methods:

Method 1:

Step 001. the base station sends system bandwidth indication information; the system bandwidth indication information may be sent in an MIB, SIB, or RRC signaling;

step 002. the LTE PRBs and the guard band PRBs are uniformly numbered, including, but not limited to, sequentially numbering according to frequencies in ascending order; and the base station configures the non-anchor PRB as a number obtained according to the numbering method; the non-anchor PRB may be configured through RRC signaling.

Optionally, when the UE is in the in-band mode of operation, a second offset of the anchor PRB from the middle PRB of LTE is sent to the UE, wherein the second offset is sent through an MIB, SIB, or RRC signaling;

optionally, when the UE is in the guard-band mode of operation, an offset of a central frequency of the anchor PRB from the LTE central frequency is sent to the UE, wherein the offset from the LTE central frequency is sent through a SIB or RRC signaling.

Method 2:

Step 001: the base station configures an offset of the non-anchor PRB from the anchor PRB and an offset indication; the offset indication is used for indicating whether the non-anchor PRB, when compared with the anchor PRB, is in a lower frequency or higher frequency.

Optionally, when the UE is in the in-band mode of operation, a second offset of the anchor PRB from the Middle PRB of LTE is sent to the UE, wherein the second offset is sent through an MIB, SIB, or RRC signaling;

optionally, when the UE is in the guard-band mode of operation, an offset of the anchor PRB from the LTE central frequency is sent to the UE, wherein the offset from the LTE central frequency is sent through a SIB or RRC signaling.

(2) If the non-anchor PRB is taken from LTE PRBs or PRBs determined according to an anchor PRB central frequency offset set, the non-anchor PRB may be configured according to the following methods:

The LTE PRBs and the PRBs determined according to the anchor PRB central frequency set are uniformly numbered in a predefined order, including, but not limited to, sequentially numbering according to frequencies in ascending order, and the base station configures the non-anchor PRB as a number obtained according to the method. The non-anchor PRB may be sent through RRC signaling. For example, when the bandwidth is 20 MHz, there are 100 LTE PRBs; the anchor PRB central frequency set corresponds to 18 PRBs, and an offset of a central frequency of the PRB from the LTE central frequency is a certain element in the anchor PRB central frequency offset set (some PRBs having overlapping sub-carriers exist therein). The 118 PRBs are sequentially numbered from 0 to 117 according to frequencies in ascending order. If the base station configures the non-anchor PRB as the PRB corresponding to the number 3, the PRB corresponds to a PRB that is offset from the LTE central frequency by −9397.5 kHz. If the base station configures the non-anchor PRB as the PRB corresponding to the number 11, the PRB is an LTE PRB having an LTE PRB number 1.

Optionally, when the UE is in the in-band mode of operation, system bandwidth information is sent to the UE; the system bandwidth is sent through a SIB or RRC signaling;

optionally, when the UE is in the in-band mode of operation, a second offset of the anchor PRB from the Middle PRB of LTE and a system bandwidth are sent to the UE; the second offset and the system bandwidth are sent through an MIB, SIB, or RRC signaling;

optionally, when the UE is in the guard-band mode of operation, an offset of the anchor PRB from the LTE central frequency is sent to the UE, wherein the offset from the LTE central frequency is sent through a SIB or RRC signaling.

(3) If the non-anchor PRB is taken from LTE PRBs or a certain reference anchor PRB set, the non-anchor PRB may be configured according to the following method:

the LTE PRBs and the PRBs in the reference anchor PRB set are uniformly numbered, including, but not limited to, sequentially numbering according to frequencies in ascending order; and the base station configures the non-anchor PRB as a number obtained according to the method.

Optionally, the base station further needs to configure an offset of the reference anchor PRB from the LTE central frequency.

The methods and related devices according to the present invention have been described above in conjunction with the preferred embodiments. It should be understood by those skilled in the art that the methods shown above are only exemplary. The method of the present invention is not limited to steps or sequences illustrated above. The network node and user equipment shown above may include more modules, for example, may further include modules that can be developed or developed in future to be applied to a base station or a UE. Various identifiers shown above are only exemplary, and are not meant for limiting the present invention. The present invention is not limited to specific information elements serving as examples of these identifiers. Those skilled in the art can make various alterations and modifications according to the teachings of the illustrated embodiments.

It should be understood that the above embodiments of the present invention may be implemented through software, hardware or a combination of software and hardware. For example, various components of the base station and user equipment in the above embodiments can be implemented through multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" refers to a mobile communication data and control switching center with large transmission power and wide coverage area, including resource allocation scheduling, data receiving, and transmitting functions. The term "user equipment" refers to a user mobile terminal, such as a terminal device that can perform wireless communication with a base station or a micro base station, including a mobile phone, a notebook, or the like.

In addition, the embodiments of the present invention, disclosed here, may be implemented on a computer program product. More specifically, the computer program product is a product described as below. The product has a computer-readable medium on which a computer program logic is encoded. The computer program logic provides relevant operations to implement the above-described technical solution of the present invention when the product is executed on a computing device. The computer program logic enables a processor to execute the operations (methods) described in the embodiments of the present invention when the product is executed on at least one processor of a computing system. Such an arrangement of the present invention is typically provided as software, a code, and/or other data structures that are configured or encoded on a computer-readable medium, such as a light medium (e.g., a CD-ROM), a floppy disk or a hard disk, or, for example, firmware or other media of microcodes on one or more ROM or RAM or PROM chips, or downloadable software images, shared database and so on in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general purpose processors, digital signal processors (DSPs), application specific integrated circuits (ASICs) or general purpose integrated circuits, field programmable gate arrays (FPGAs) or other programmable logic devices, discrete gates or transistor logic, or discrete hardware components, or any combination of the above. The general purpose processor may be a microprocessor; or the processor may be an existing processor, a controller, a microcontroller, or a state machine. The above-mentioned general purpose processor or each circuit may be configured with a digital circuit or may be configured with a logic circuit. In addition, when an advanced technology that can replace current integrated circuits emerge due to advances in semiconductor technology, the present invention may also use integrated circuits obtained using this advanced technology.

In addition, each functional module or each feature of the base station device and the user equipment used in each of the above embodiments may be implemented or executed by a circuit, which is usually one or more integrated circuits. Circuits designed to execute various functions described in this description may include general purpose processors, digital signal processors (DSPs), application specific integrated circuits (ASICs) or general purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The above-mentioned general purpose processor or each circuit may be configured with a digital circuit or may be configured with a logic circuit. In addition, when an advanced technology that can replace current integrated circuits emerges due to advances in semiconductor technology, the present invention may also use integrated circuits obtained using this advanced technology.

Although the present invention has been shown in connection with the preferred embodiments of the present invention, it will be understood by those skilled in the art that various modifications, substitutions and alterations may be made to the present invention without departing from the spirit and scope of the present invention. Accordingly, the present invention should not be defined by the above-described embodiments, but should be defined by the appended claims and their equivalents.

The program running on the device according to the present invention may be a program that enables the computer to implement the functions of the embodiments of the present invention by controlling the central processing unit (CPU). The program or information processed by the program can be stored temporarily in volatile memory (e.g., random access memory RAM), hard disk drive (HDD), non-volatile memory (e.g., flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a recording medium for a semiconductor recording medium, an optical recording medium, a magnetic recording medium, a shorttime dynamic memory program, or any other recording medium readable by a computer.

Various features or functional modules of the device used in the above embodiments may be implemented or executed by circuits (e.g., monolithic or multi-piece integrated circuits). Circuits designed to execute the functions described in this description may include general purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of advances in semiconductor technology, the present invention may also be implemented using these new integrated circuit technologies.

Furthermore, the present invention is not limited to the embodiments described above. Although various examples of the described embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments, and the present invention also includes any design modifications that do not depart from the main idea of the present invention. In addition, various modifications can be made to the present invention within the scope of the claims, and embodiments resulting from the appropriate combination of the technical means disclosed in different embodiments are also included within the technical scope of the present invention. In addition, components with the same effect described in the above embodiments may be replaced with one another.

The invention claimed is:

1. A user equipment (UE) comprising:
receiving circuitry configured to receive indication information indicating whether a non-anchor physical resource block (PRB) is in in-band of an LTE carrier or in a guard band of the LTE carrier, and to receive, in a case that (a) an anchor PRB is in the guard band of the LTE carrier, and (b) the indication information indicates that the non-anchor PRB is in in-band of the LTE carrier, a non-anchor PRB configuration which indicates that the non-anchor PRB is in in-band of the LTE carrier and indicates a first offset from a middle PRB in a set of LTE in-band PRBs; and
determination circuitry configured to determine, based on the non-anchor PRB configuration, a location of the non-anchor PRB in the set of LTE in-band PRBs, wherein
the receiving circuitry is configured to receive an anchor PRB configuration, in a case that the anchor PRB is in in-band of the LTE carrier,
the anchor PRB configuration indicates that the anchor PRB is in in-band of the LTE carrier and indicates a second offset from the middle PRB in the set of LTE in-band PRBs,
the first offset is an integer number selected from a first range,
the second offset is an integer number selected from a second range different from the first range, and
the non-anchor PRB is different from the anchor PRB in that:
the non-anchor PRB is a PRB used by the UE for receiving a unicast transmission related to NarrowBand IOT (NB-IoT), but not used by the UE for receiving a primary synchronization signal (PSS), a secondary synchronization signal (SSS), a master system information block (MIB), and a system information block (SIB), each of which is related to the NB-IoT; and
the anchor PRB is a PRB used by the UE for receiving the PSS, the SSS, the MIB, and/or the SIB.

2. The UE of claim 1, wherein
the receiving circuitry receives information indicating whether a physical cell identifier (PCI) which is same as the PCI of the LTE carrier is used for a cell where the anchor PRB locates.

3. The UE of claim 1, wherein
the first range is a range of −55 to 54.

4. A method performed by a user equipment (UE) comprising:
receiving indication information indicating whether a non-anchor physical resource block (PRB) is in in-band of an LTE carrier or in a guard band of the LTE carrier,
receiving, in a case that (a) an anchor PRB is in the guard band of the LTE carrier, and (b) the indication information indicates that the non-anchor PRB is in in-band of the LTE carrier, a non-anchor PRB configuration which indicates that the non-anchor PRB is in in-band of the LTE carrier and indicates a first offset from a middle PRB in a set of LTE in-band PRBs;
determining, based on the non-anchor PRB configuration, a location of the non-anchor PRB in the set of LTE in-band PRBs; and
receiving an anchor PRB configuration in a case that the anchor PRB is in in-band of the LTE carrier, the anchor PRB configuration being a configuration which indicates that the anchor PRB is in in-band of the LTE carrier and indicates a second offset from the middle PRB in the set of LTE in-band PRBs,
wherein
the first offset is an integer number selected from a first range,
the second offset is an integer number selected from a second range different from the first range, and
the non-anchor PRB is different from the anchor PRB in that:
the non-anchor PRB is a PRB used by the UE for receiving a unicast transmission related to NarrowBand IOT (NB-IoT) but not used by the UE for receiving a primary synchronization signal (PSS), a secondary synchronization signal (SSS), a master system information block (MIB), and a system information block (SIB), each of which is related to the NB-IoT; and
the anchor PRB is a PRB used by the UE for receiving the PSS, the SSS, the MIB, and/or the SIB.

5. A base station comprising:
generating circuitry configured to generate indication information indicating whether a non-anchor physical resource block (PRB) is in in-band of an LTE carrier or in a guard band of the LTE carrier; and
transmitting circuitry configured to transmit the indication information to a user equipment (UE), wherein in a case that (a) an anchor PRB is in the guard band of the LTE carrier, and (b) the indication information indicates that the non-anchor PRB is in in-band of the LTE carrier, the generating circuitry is configured to generate a non-anchor PRB configuration which indicates that the non-anchor PRB is in in-band of the LTE carrier and indicates a first offset from a middle PRB in a set of LTE in-band PRBs, and the transmitting circuitry is configured to transmit the non-anchor PRB configuration to the UE, in a case that the anchor PRB is in in-band of the LTE carrier, the generating circuitry is configured to generate an anchor PRB configuration which indicates that the anchor PRB is in in-band of the LTE carrier and indicates a second offset from the middle PRB in the set of LTE in-band PRBs, and the transmitting circuitry is configured to transmit the anchor PRB configuration to the UE, the first offset is an integer number selected from a first range, the second offset is an integer number selected from a second range different from the first range, and the non-anchor PRB is different from the anchor PRB in that:

the non-anchor PRB is a PRB used by the UE for receiving a unicast transmission related to NarrowBand IOT (NB-IoT) but not used by the UE for receiving a primary synchronization signal (PSS), a secondary synchronization signal (SSS), a master system information block (MIB), and a system information block (SIB), each of which is related to the NB-IoT; and the anchor PRB is a PRB used by the UE for receiving the PSS, the SSS, the MIB, and/or the SIB.

6. A method performed by a base station comprising:

generating indication information indicating whether a non-anchor physical resource block (PRB) is in in-band of an LTE carrier or in a guard band of the LTE carrier;

transmitting the indication information to a user equipment (UE);

in a case that (a) an anchor PRB is in the guard band of the LTE carrier, and (b) the indication information indicates that the non-anchor PRB is in in-band of the LTE carrier, generating a non-anchor PRB configuration which indicates that the non-anchor PRB is in in-band of the LTE carrier and indicates a first offset from a middle PRB in a set of LTE in-band PRBs, and transmitting the non-anchor PRB configuration to the UE; and in a case that the anchor PRB is in in-band of the LTE carrier, generating an anchor PRB configuration which indicates that the anchor PRB is in in-band of the LTE carrier and indicates a second offset from the middle PRB in the set of LTE in-band PRBs, and transmitting the anchor PRB configuration to the UE, wherein the first offset is an integer number selected from a first range, the second offset is an integer number selected from a second range different from the first range, and the non-anchor PRB is different from the anchor PRB in that:

the non-anchor PRB is a PRB used by the UE for receiving a unicast transmission related to NarrowBand IOT (NB-IoT) but not used by the UE for receiving a primary synchronization signal (PSS), a secondary synchronization signal (SSS), a master system information block (MIB), and a system information block (SIB), each of which is related to the NB-IoT; and the anchor PRB is a PRB used by the UE for receiving the PSS, the SSS, the MIB, and/or the SIB.

* * * * *